(12) United States Patent
Kaneko et al.

(10) Patent No.: US 10,096,851 B2
(45) Date of Patent: Oct. 9, 2018

(54) SOLID OXIDE FUEL CELL SYSTEM AND METHOD OF STOPPING THE SAME

(71) Applicants: PANASONIC CORPORATION, Osaka (JP); TOTO LTD., Fukuoka (JP)

(72) Inventors: Yasushi Kaneko, Osaka (JP); Shigenori Onuma, Kyoto (JP); Kunihiro Ukai, Nara (JP); Akinori Yukimasa, Osaka (JP); Hiroshi Shirahama, Fukuoka (JP); Toshiharu Otsuka, Fukuoka (JP); Hiromi Kita, Nara (JP); Taiichiro Sakamoto, Fukuoka (JP); Toshiharu Ooe, Fukuoka (JP)

(73) Assignees: PANASONIC CORPORATION, Osaka (JP); TOTO LTD., Fukuoka (JP)

( * ) Notice: Subject to any disclaimer, the term of this patent is extended or adjusted under 35 U.S.C. 154(b) by 175 days.

(21) Appl. No.: 15/312,246

(22) PCT Filed: Feb. 9, 2015

(86) PCT No.: PCT/JP2015/000573
§ 371 (c)(1),
(2) Date: Nov. 18, 2016

(87) PCT Pub. No.: WO2015/177949
PCT Pub. Date: Nov. 26, 2015

(65) Prior Publication Data
US 2017/0092969 A1 Mar. 30, 2017

(30) Foreign Application Priority Data

May 21, 2014 (JP) .................................. 2014-104902
May 28, 2014 (JP) .................................. 2014-109675

(51) Int. Cl.
*H01M 8/06* (2016.01)
*H01M 8/04303* (2016.01)
(Continued)

(52) U.S. Cl.
CPC .......... *H01M 8/04303* (2016.02); *B01J 7/00* (2013.01); *C01B 3/38* (2013.01); *H01M 8/04231* (2013.01);
(Continued)

(58) Field of Classification Search
CPC ......... H01M 8/04303; H01M 8/04753; H01M 8/04761; H01M 8/04231; H01M 8/0618; H01M 8/0675
See application file for complete search history.

(56) References Cited

U.S. PATENT DOCUMENTS 6,395,414 B1  5/2002  Clingerman et al.
2009/0280361 A1*  11/2009  Bitoh .................... C01B 3/323
                                                429/422
(Continued)

FOREIGN PATENT DOCUMENTS

EP    2056384 A1   5/2009
EP    2112708 A2   10/2009
(Continued)

OTHER PUBLICATIONS

International Search Report issued in Appliction No. PCT/JP2015/000573 dated Mar. 31, 2015, with English translation.
(Continued)

*Primary Examiner* — Stewart A Fraser
(74) *Attorney, Agent, or Firm* — McDermott Will & Emery LLP

(57) ABSTRACT

A solid oxide fuel cell system includes: a fuel cell unit including a solid oxide fuel cell and a mixer, the solid oxide fuel cell including an anode gas passage and a cathode gas (Continued)

passage, the mixer mixing an anode off gas discharged from the anode gas passage and a cathode off gas discharged from the cathode gas passage; a power-generating raw material supply device operative to supply a power-generating raw material to the fuel cell unit; a combustible gas passage, which extends from the power-generating raw material supply device to a downstream end of the anode gas passage; an oxidizing gas supply device operative to supply an oxidizing gas to the cathode gas passage; and a controller operative to, after electric power generation by the fuel cell unit is stopped, control the power-generating raw material supply device to supply the power-generating raw material in a volume more than or equal to a volume of the combustible gas passage to the combustible gas passage, and concurrently control the oxidizing gas supply device to supply the oxidizing gas to the cathode gas passage.

14 Claims, 15 Drawing Sheets

(51) Int. Cl.
| | |
|---|---|
| *C01B 3/38* | (2006.01) |
| *B01J 7/00* | (2006.01) |
| *H01M 8/04223* | (2016.01) |
| *H01M 8/04746* | (2016.01) |
| *H01M 8/0612* | (2016.01) |
| *H01M 8/0662* | (2016.01) |
| *H01M 8/124* | (2016.01) |
| *H01M 8/04014* | (2016.01) |

(52) U.S. Cl.
CPC ... *H01M 8/04753* (2013.01); *H01M 8/04761* (2013.01); *H01M 8/0618* (2013.01); *H01M 8/0675* (2013.01); *C01B 2203/0233* (2013.01); *C01B 2203/066* (2013.01); *C01B 2203/1058* (2013.01); *C01B 2203/1064* (2013.01); *C01B 2203/1241* (2013.01); *H01M 8/04014* (2013.01); *H01M 2008/1293* (2013.01)

(56) References Cited

U.S. PATENT DOCUMENTS

| | | | |
|---|---|---|---|
| 2012/0183875 A1 | 7/2012 | Yumita | |
| 2013/0273445 A1 | 10/2013 | Kobayashi | |
| 2014/0295303 A1* | 10/2014 | Matsuo | H01M 8/04664 429/423 |
| 2015/0044587 A1 | 2/2015 | Matsuo et al. | |
| 2017/0047601 A1* | 2/2017 | Onuma | H01M 8/1231 |

FOREIGN PATENT DOCUMENTS

| | | |
|---|---|---|
| JP | 2002-246053 A | 8/2002 |
| JP | 2003-157875 A | 5/2003 |
| JP | 2005-350300 A | 12/2005 |
| JP | 2006-210019 A | 8/2006 |
| JP | 2011-204559 A | 10/2011 |
| JP | 2012-134046 A | 7/2012 |
| JP | 2013-165042 A | 8/2013 |
| WO | 2011/010365 A1 | 1/2011 |
| WO | 2013/001753 A1 | 1/2013 |
| WO | 2013/035312 A1 | 3/2013 |
| WO | 2013/153944 A1 | 10/2013 |

OTHER PUBLICATIONS

Extended European Search Report issued in Application No. 15796401.6 dated Apr. 18, 2017.

* cited by examiner

SOLID OXIDE FUEL CELL SYSTEM AND METHOD OF STOPPING THE SAME

RELATED APPLICATIONS

This application is the U.S. National Phase under 35 U.S.C. § 371 of International Application No. PCT/JP2015/000573, filed on Feb. 9, 2015, which in turn claims the benefit of Japanese Application No. 2014-104902, filed on May 21, 2014 and Japanese Application No. 2014-109675, filed on May 28, 2014, the disclosures of which are incorporated by reference herein.

TECHNICAL FIELD

The present invention relates to a solid oxide fuel cell system and a method of stopping the same.

BACKGROUND ART

Patent Literature 1 discloses a hydrogen generation apparatus including: a reformer configured to generate a hydrogen-containing gas from a raw material gas (i.e., from a power-generating raw material); a raw material passage, through which the raw material gas supplied to the reformer flows; a pressure adjuster provided on the raw material passage and configured to drop the pressure of the raw material gas; a booster provided on the raw material passage and configured to increase the pressure of the raw material gas that has passed through the pressure adjuster; a hydrodesulfurizer provided on the raw material passage and configured to remove sulfur compounds from the raw material gas that has passed through the pressure adjuster; and a recycle passage, through which the hydrogen-containing gas generated by the reformer is supplied to the raw material passage at a position that is downstream of the pressure adjuster and upstream of the hydrodesulfurizer and the booster.

Patent Literature 2 discloses a solid oxide fuel cell system including: a fuel cell module; a fuel supply apparatus; a water supply apparatus; an air supply apparatus; a reformer; and a controller configured to control the fuel supply apparatus, the water supply apparatus, and the air supply apparatus, as well as extraction of electric power from the fuel cell module. The controller includes a shutdown stop circuit configured to perform a shutdown stop in a state where the temperature of a fuel cell stack is higher than oxidization-suppressing temperatures. The solid oxide fuel cell system is characterized by performing a temperature drop operation of discharging high-temperature air remaining at the cathode side during a period after the shutdown stop, in which period the anode-side pressure is sufficiently higher than the cathode-side pressure and no reverse flow of air to the anode side occurs.

CITATION LIST

Patent Literature

PTL 1: International Publication No. WO 2013/001753
PTL 2: International Publication No. WO 2013/153944

SUMMARY OF INVENTION

Technical Problem

As one example, a problem to be solved by the present invention is to improve the durability of a solid oxide fuel cell system.

Solution to Problem

A solid oxide fuel cell system according to one aspect of the present invention includes: a fuel cell unit including a solid oxide fuel cell and a mixer, the solid oxide fuel cell including an anode gas passage and a cathode gas passage, the mixer mixing an anode off gas discharged from the anode gas passage and a cathode off gas discharged from the cathode gas passage; a power-generating raw material supply device operative to supply a power-generating raw material to the fuel cell unit; a combustible gas passage, which extends from the power-generating raw material supply device to a downstream end of the anode gas passage; an oxidizing gas supply device operative to supply an oxidizing gas to the cathode gas passage; and a controller operative to, after electric power generation by the fuel cell unit is stopped, control the power-generating raw material supply device to supply the power-generating raw material in a volume more than or equal to a volume of the combustible gas passage to the combustible gas passage, and concurrently control the oxidizing gas supply device to supply the oxidizing gas to the cathode gas passage.

Advantageous Effects of Invention

The above one aspect of the present invention has an advantage of being able to improve the durability of the solid oxide fuel cell system.

DESCRIPTION OF EMBODIMENTS

Figure 1:
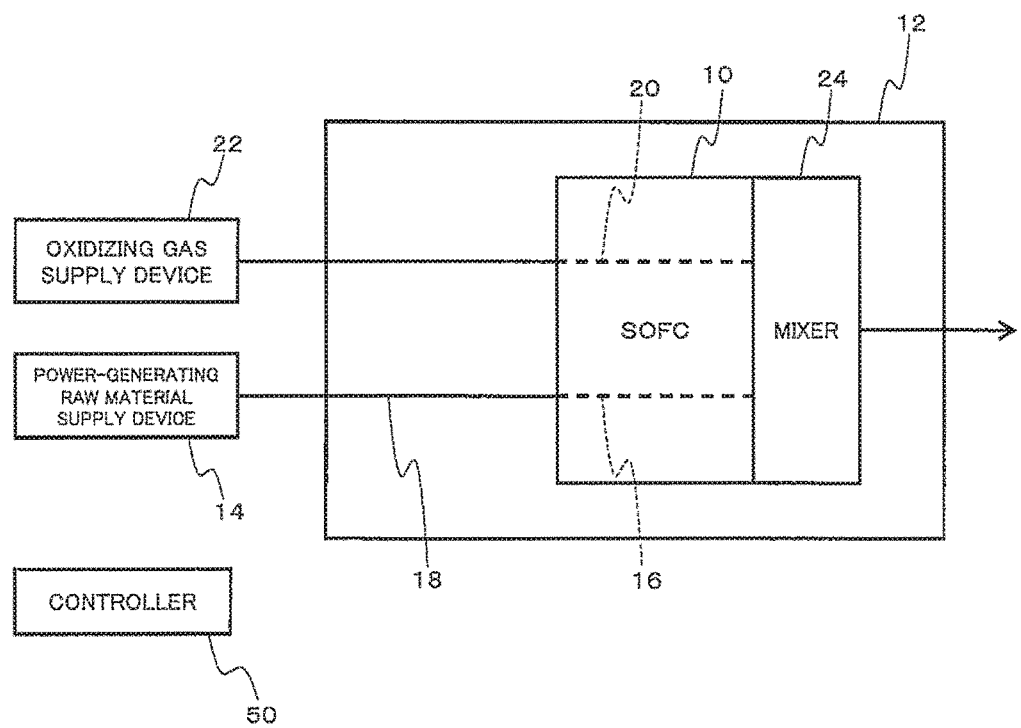
FIG. 1 is a block diagram showing one example of a schematic configuration of a solid oxide fuel cell system according to Embodiment 1

The inventors of the present invention conducted diligent studies to improve the durability of a solid oxide fuel cell system. As a result of the studies, the inventors have obtained the following findings.

A solid oxide fuel cell system is configured to: supply a hydrogen-containing gas and an oxygen-containing gas to a solid oxide fuel cell stack, which is the main body of the system's power generation part; cause an electrochemical reaction between hydrogen and oxygen to progress; and extract chemical energy generated by the electrochemical reaction as electrical energy to generate electric power. The solid oxide fuel cell stack includes, for example, cells each formed by an anode, an electrolyte, and a cathode. The anode is supplied with, for example, methane serving as a fuel, hydrogen and CO supplied from a reformer, and steam. The cathode is supplied with air. Oxygen in the air is dissociated at the interface between the cathode and the electrolyte, and spreads within the electrolyte. The spreading oxygen ions react with the anode-side hydrogen and CO at the interface between the electrolyte and the anode, and thereby water and $CO_2$ are generated. Electrons released in the reaction are extracted as electric power.

Solid oxide fuel cell systems are capable of generating electric power with high efficiency, and allowing thermal energy generated during a power generation operation to be readily utilized. Therefore, solid oxide fuel cell systems are being developed as distributed power generation systems that make it possible to realize highly efficient energy utilization.

Examples of a raw material used in a solid oxide fuel cell system include liquefied petroleum gas (LPG), liquefied natural gas (LNG), city gas, shale gas, and methane hydrate. In the case of using a hydrogen-containing gas to generate electric power, a fossil material, such as city gas containing natural gas as its major component or LPG, is used as a raw material from which the hydrogen-containing gas is generated. A hydrogen generation apparatus includes, for example, a reformer configured to cause a reaction (a reforming reaction) between the raw material and steam at temperatures of, for example, 600 to 700° C. by using a Ru catalyst or a Ni catalyst, thereby generating the hydrogen-containing gas (a reformed gas).

A sulfur-containing odorant is added to the raw material such as city gas or LPG in order to facilitate the detection of leakage of the raw material. In some cases, the raw material originally contains sulfur compounds. There are risks that such a sulfur-based odorant or naturally-derived sulfur compounds (hereinafter, collectively referred to as "sulfur compounds") poison the catalyst used in the reformer, such as a Ru catalyst or Ni catalyst, to hinder the reforming reaction, or poison the anode of the fuel cell stack to hinder the functions of the fuel cell. For this reason, in general, the hydrogen generation apparatus is provided with a desulfurizer for removing the sulfur compounds from the raw material before the raw material is introduced into the reformer.

In the solid oxide fuel cell system, the reforming reaction is caused in order to generate the hydrogen-containing gas. The raw material and water are continuously supplied during electric power generation. The supply of the raw material and water is stopped when the power generation is stopped. Accordingly, in passages through which the raw material and a combustible gas resulting from reforming the raw material flow, a steam-containing combustible gas remains after the power generation is stopped. During the power generation, the temperature of the solid oxide fuel cell is kept high in the range of 500° C. to 900° C. After the power generation is stopped, the solid oxide fuel cell is cooled down gradually.

In the cooling process, if the temperature of the steam-containing combustible gas has decreased to the dew point or lower, then water becomes condensed, which may cause durability degradation of, for example, a catalyst in a combustible gas passage and the anode of the fuel cell, which is a Ni-containing electrode.

In this respect, there is a known conventional solid oxide fuel cell system that is configured to create a reducing atmosphere by using an inert gas such as nitrogen in the cooling process, thereby performing purging of the hydrogen-containing gas. However, in the case of adopting such a configuration in which the purging is performed by using an inert gas, it is necessary to install a passage dedicated for the purging, which causes increase in the size of the solid oxide fuel cell system.

There is another proposed fuel cell system in which existing passages for flowing air for reforming and air for power generation are utilized to perform purging with the air for reforming and the air for power generation (see Patent Literature 2, for example).

In the configuration disclosed in Patent Literature 2, for example, it is conceivable to, at the time of stopping the fuel cell system from operating, supply the air for reforming and the air for power generation to purge a combustible gas passage with the air, the combustible gas passage including, for example, a reformer, a fuel gas supply pipe, a manifold, and the anode in each fuel cell unit. It is also conceivable to purge a cathode gas passage with the air, the cathode gas passage including, for example, the cathode in a power generating chamber, an exhaust passage, and an air heat exchanger.

By purging the combustible gas passage with the air, the possibility that condensation water is generated from steam remaining in the passage and thereby the combustible gas passage and the anode become oxidized is reduced. Also, by purging the cathode gas passage with the air, the possibility that steam discharged from the anode is dew-condensed in the cathode gas passage is reduced.

However, the inventors have found the following problem in the configuration disclosed in Patent Literature 1. If purging is performed with the raw material gas, then the raw material gas is discharged from the fuel cell stack, and as a result, there is a possibility that the cathode near an exhaust port of the stack is reduced due to the raw material gas, causing degradation of the stack.

Also, in the configuration disclosed in Patent Literature 2, in order to purge the combustible gas passage with the air for reforming, it is necessary to install a device for supplying the air for reforming. In addition, there is another problem in that, in the case of including a hydrodesulfurizer, air remains in the hydrodesulfurizer at the time of stopping, and thereby a desulfurization catalyst therein becomes oxidized.

Further, the inventors have found yet another problem as follows. In a case where a solid oxide fuel cell system includes a mixer for mixing an anode off gas discharged from an anode gas passage and a cathode off gas discharged from a cathode gas passage, if the anode of the fuel cell is purged with the raw material, the raw material discharged from the anode reduces the cathode to cause degradation of the cathode.

In view of the above, in relation to a solid oxide fuel cell system, the inventors have arrived at the idea of, after the power generation by the fuel cell unit is stopped, supplying an oxidizing gas to the cathode gas passage by controlling an oxidizing gas supply device at same time as purging the interior of the combustible gas passage by controlling a power-generating raw material supply device.

According to the above configuration, in an operation stop process that is performed at the time of stopping the solid oxide fuel cell system from operating, the possibility that condensation water is generated at the anode and thereby catalyst degradation is caused is reduced, and also, the possibility that the cathode comes into contact with the raw material gas is reduced. This makes it possible to improve the durability of the solid oxide fuel cell system. It should be noted that a process that is performed at the time of stopping the solid oxide fuel cell system from operating, the process being made up of a plurality of process steps including, for example, the above-described purging step, is hereinafter referred to as an operation stop process. Also, a method of performing the operation stop process is hereinafter referred to as a method of stopping the solid oxide fuel cell system.

Further, in the case of a fuel cell system in which the combustible gas passage is purged by using a raw material gas, the raw material gas, which is a combustible gas, is directly discharged to the outside of the fuel cell system after the raw material gas is used in the purging in the cooling process. Thus, the inventors have noticed that there is a problem in terms of safety.

Based on the above findings, the inventors of the present invention have found that, after the combustible raw material gas is used in the purging, by combusting the raw material gas before discharging it to the outside of the system, the fuel cell system can be safely stopped from operating. The inventors have also found that, in order to prevent overhearing of the solid oxide fuel cell due to the combustion of the raw material gas, it is necessary to devise a suitable manner of combustion of the raw material gas so that the temperature of the solid oxide fuel cell will be within a proper temperature range.

Hereinafter, embodiments of the present invention are described with reference to the accompanying drawings.

The embodiments described below show specific examples of the present invention. Therefore, numerical values, shapes, materials, components, the arrangement and the manner of connection of the components, steps, the order of the steps, etc., shown in the embodiments below are mere examples, and do not limit the scope of the present invention. Moreover, among the components in the embodiments below, components not recited in any one of the independent claims defining the most generic part of the concept of the present invention are described as optional components. In the description below, in some cases, the description of components that are denoted by the same reference signs in the drawings may be omitted. The drawings show each component schematically in order to facilitate the understanding thereof. Therefore, in some cases, the drawings may not display precise shapes, dimensional ratios, etc. Furthermore, in a production method, for example, the order of the steps may be changed as necessary, and also, other known steps may be additionally incorporated in the method.

Embodiment 1

A solid oxide fuel cell system according to Embodiment 1 includes: a fuel cell unit including a solid oxide fuel cell and a mixer, the solid oxide fuel cell including an anode gas passage and a cathode gas passage, the mixer mixing an anode off gas discharged from the anode gas passage and a cathode off gas discharged from the cathode gas passage; a power-generating raw material supply device operative to supply a power-generating raw material to the fuel cell unit; a combustible gas passage, which extends from the power-generating raw material supply device to a downstream end of the anode gas passage; an oxidizing gas supply device operative to supply an oxidizing gas to the cathode gas passage; and a controller operative to, after electric power generation by the fuel cell unit is stopped, control the power-generating raw material supply device to supply the power-generating raw material in a volume more than or equal to a volume of the combustible gas passage to the combustible gas passage, and concurrently control the oxidizing gas supply device to supply the oxidizing gas to the cathode gas passage.

A method of stopping a solid oxide fuel cell system according to Embodiment 1 includes: stopping electric power generation by a fuel cell unit including a solid oxide fuel cell; in a case where a passage extending from a power-generating raw material supply device to a downstream end of an anode gas passage of the solid oxide fuel cell serves as a combustible gas passage, after the electric power generation by the fuel cell unit is stopped, supplying a power-generating raw material in a volume more than or equal to a volume of the combustible gas passage to the combustible gas passage, and concurrently supplying an oxidizing gas to a cathode gas passage of the solid oxide fuel cell; and mixing an anode off gas discharged from the anode gas passage and a cathode off gas discharged from the cathode gas passage, and combusting the mixed gas.

The above configurations make it possible to improve the durability of the solid oxide fuel cell system.

In the above solid oxide fuel cell system, the controller may control the oxidizing gas supply device such that a volume of the oxidizing gas supplied to the cathode gas passage after the electric power generation by the fuel cell unit is stopped is more than or equal to a volume of the cathode gas passage.

In the above solid oxide fuel cell system, the controller may control the oxidizing gas supply device such that the supply of the oxidizing gas to the cathode gas passage is continued after the supply of the power-generating raw material to the combustible gas passage is stopped after the electric power generation by the fuel cell unit is stopped.

The above configurations make it possible to improve the durability of the solid oxide fuel cell system more effectively.

In the above solid oxide fuel cell system, the mixer may include an ignitor operative to ignite and combust a mixed gas of the anode off gas and the cathode off gas, and the controller may control the ignitor to ignite and combust the mixed gas of the anode off gas and the cathode off gas after the electric power generation by the fuel cell unit is stopped.

According to the above configuration, in a case where the mixed gas is combustible gas, the possibility that the combustible gas is directly discharged to the outside of the solid oxide fuel cell system can be reduced.

The above solid oxide fuel cell system may include an oxidizing gas passage, which extends from the oxidizing gas supply device to a downstream end of the cathode gas passage and through which the oxidizing gas flows. The controller may, in an operation stop process of the solid oxide fuel cell system, control the oxidizing gas supply device to supply the oxidizing gas through the oxidizing gas passage, control the power-generating raw material supply device to intermittently supply the power-generating raw material through the combustible gas passage, and control the ignitor to ignite the combustible gas that is discharged to the mixer intermittently in accordance with the intermittent supply of the power-generating raw material.

The combustible gas herein contains, for example, not only the power-generating raw material but also a hydrogen-containing gas supplied to the anode at the time of performing electric power generation.

According to the above configuration, in the operation stop process of the solid oxide fuel cell system, the oxidizing gas can be supplied through the oxidizing gas passage, and also, the power-generating raw material can be intermittently supplied through the combustible gas passage. That is, the oxidizing gas passage can be purged with the oxidizing gas, and the combustible gas passage can be purged with the power-generating raw material. Therefore, in the solid oxide fuel cell system according to Embodiment 1 of the present invention, reduction of the cathode of the solid oxide fuel cell due to the combustible gas discharged from the anode of the solid oxide fuel cell can be prevented in the operation stop process.

Moreover, in the solid oxide fuel cell system, by the intermittent supply of the power-generating raw material, the steam remaining in the combustible gas passage can be discharged. This makes it possible to prevent oxidization of the combustible gas passage and the anode due to condensation water.

Furthermore, in the solid oxide fuel cell system, the controller is capable of: causing the power-generating raw material to be supplied to the fuel cell unit intermittently while causing the oxidizing gas to be supplied to the fuel cell unit; and controlling the operation of the ignitor to ignite the combustible gas that is discharged to a combustor intermittently.

Accordingly, in the solid oxide fuel cell system, the combustible gas discharged from the combustible gas passage to the combustor as a result of the purging utilizing the power-generating raw material can be brought into flaming combustion. This makes it possible to prevent the combustible gas from being released to the external atmosphere. Therefore, the solid oxide fuel cell system according to Embodiment 1 of the present invention has an advantage of being able to stop operating safely.

In the above solid oxide fuel cell system, the fuel cell unit may include a reformer operative to reform the power-generating raw material to generate a hydrogen-containing gas, and the controller may control the oxidizing gas supply device and the power-generating raw material supply device to supply the power-generating raw material to the fuel cell unit intermittently while supplying the oxidizing gas to the fuel cell unit, such that a temperature of the reformer is lower than temperatures at which thermal decomposition of the power-generating raw material occurs.

According to the above configuration, the controller controls the power-generating raw material supply device to supply the power-generating raw material intermittently, and thereby increase in the temperature of the reformer due to the flaming combustion of the combustible gas can be suppressed, such that the temperature of the reformer is lower than the temperatures at which thermal decomposition of the power-generating raw material occurs. Thus, compared to a configuration in which the power-generating raw material is supplied non-intermittently, the cooling time of the fuel cell unit can be reduced. In addition, carbonization of the power-generating raw material (carbon deposition) due to excessive temperature increase of the reformer can be prevented. Therefore, the following situation can be prevented: carbon deposition occurs on the reforming catalyst filling in the reformer; and thereby the reforming catalyst degrades. This makes it possible to improve the durability of the reforming catalyst.

In the above solid oxide fuel cell system, the controller may control the oxidizing gas supply device and the power-generating raw material supply device to supply the power-generating raw material to the fuel cell unit intermittently while supplying the oxidizing gas to the fuel cell unit, such that a temperature of the solid oxide fuel cell is lower than temperatures at which thermal decomposition of the power-generating raw material occurs.

According to the above configuration, the controller controls the power-generating raw material supply device to supply the power-generating raw material intermittently, and thereby increase in the temperature of the solid oxide fuel cell due to the flaming combustion of the combustible gas can be suppressed, such that the temperature of the solid oxide fuel cell is lower than the temperatures at which thermal decomposition of the power-generating raw material occurs. Thus, compared to a configuration in which the power-generating raw material is supplied non-intermittently, the cooling time of the fuel cell unit can be reduced. In addition, carbonization of the power-generating raw material (carbon deposition) due to excessive temperature increase of the solid oxide fuel cell can be prevented. Therefore, the following situation can be prevented: carbon deposition occurs on the solid oxide fuel cell; and thereby the solid oxide fuel cell degrades. This makes it possible to improve the durability of the solid oxide fuel cell.

In the above solid oxide fuel cell system, the fuel cell unit may include a reformer operative to reform the power-generating raw material to generate a hydrogen-containing gas, and the controller may control the oxidizing gas supply device and the power-generating raw material supply device to supply the power-generating raw material to the fuel cell unit intermittently while supplying the oxidizing gas to the fuel cell unit, such that a temperature of the reformer and a temperature of the solid oxide fuel cell are lower than temperatures at which thermal decomposition of the power-generating raw material occurs.

According to the above configuration, the controller controls the power-generating raw material supply device to supply the power-generating raw material intermittently, and thereby increase in the temperatures of the reformer and the solid oxide fuel cell due to the flaming combustion of the combustible gas can be suppressed, such that the temperatures of the reformer and the solid oxide fuel cell are lower than the temperatures at which thermal decomposition of the power-generating raw material occurs. Thus, compared to a configuration in which the power-generating raw material is supplied non-intermittently, the cooling time of the fuel cell unit can be reduced. In addition, carbonization of the power-generating raw material (carbon deposition) due to excessive temperature increase of the reformer and the solid oxide fuel cell can be prevented. Therefore, the following situation can be prevented: carbon deposition occurs on the solid oxide fuel cell and the reforming catalyst filling in the reformer; and thereby the solid oxide fuel cell and the reforming catalyst degrade. This makes it possible to improve the durability of the solid oxide fuel cell and the reforming catalyst.

In the above solid oxide fuel cell system, the controller may control the oxidizing gas supply device and the power-generating raw material supply device to start supplying the power-generating raw material to the fuel cell unit while supplying the oxidizing gas to the fuel cell unit when the temperature of the reformer has decreased below the temperatures at which thermal decomposition of the power-generating raw material occurs and reached a lower limit temperature for water to exist as steam.

According to the above configuration, the controller can control the power-generating raw material supply device to start supplying the power-generating raw material to the fuel cell unit when the temperature of the reformer has decreased below the temperatures at which thermal decomposition of the power-generating raw material occurs and reached the lower limit temperature for water to exist as steam. Accordingly, the solid oxide fuel cell system can supply the power-generating raw material and cause flaming combustion to heat the reformer before condensation water is generated on the reforming catalyst filling in the reformer. This makes it possible to prevent the generation of condensation water on the reforming catalyst.

In the above solid oxide fuel cell system, the fuel cell unit may include a hydrodesulfurizer operative to remove a sulfur compound from the power-generating raw material supplied from the power-generating raw material supply device.

In the above solid oxide fuel cell system, the hydrodesulfurizer may be heated by exhaust heat generated as a result of flaming combustion in the combustor.

According to the above configurations, in a case, for example, where it is necessary to heat the hydrodesulfurizer to a predetermined temperature, the hydrodesulfurizer can be heated by utilizing the exhaust heat of the flaming combustion in the combustor. This makes it possible to improve energy utilization efficiency in the solid oxide fuel cell system.

In the above solid oxide fuel cell system, the controller may control the oxidizing gas supply device and the power-generating raw material supply device to start supplying the power-generating raw material to the fuel cell unit while supplying the oxidizing gas to the fuel cell unit when a temperature of the hydrodesulfurizer has decreased below temperatures at which thermal decomposition of the power-generating raw material occurs and reached a lower limit temperature for water to exist as steam.

According to the above configuration, the controller can control the power-generating raw material supply device to start supplying the power-generating raw material to the fuel cell unit when the temperature of the hydrodesulfurizer has decreased below the temperatures at which thermal decomposition of the power-generating raw material occurs and reached the lower limit temperature for water to exist as steam. Accordingly, the solid oxide fuel cell system can supply the power-generating raw material and cause flaming combustion to heat the hydrodesulfurizer before condensation water is generated in the hydrodesulfurizer. This makes it possible to prevent the generation of condensation water in the hydrodesulfurizer.

In the above method of stopping a solid oxide fuel cell system, after the electric power generation by the fuel cell unit is stopped and when the supply of the power-generating raw material to the combustible gas passage is started, a temperature of the solid oxide fuel cell may be not lower than 100° C. and not higher than 400° C.

[Apparatus Configuration]

FIG. 1 is a block diagram showing one example of a schematic configuration of a solid oxide fuel cell system according to Embodiment 1. Hereinafter, a solid oxide fuel cell system 1 according to Embodiment 1 is described with reference to FIG. 1.

In the example shown in FIG. 1, the solid oxide fuel cell system 1 includes: a fuel cell unit 12 including a solid oxide fuel cell 10 and a mixer 24; a power-generating raw material supply device 14; a combustible gas passage 18; an oxidizing gas supply device 22; and a controller 50.

The solid oxide fuel cell 10 includes an anode gas passage 16 and a cathode gas passage 20. The solid oxide fuel cell 10 may generate electric power by directly using the power-generating raw material, or by using a reformed gas that is obtained by reforming the raw material by a reformer or the like.

The solid oxide fuel cell 10 includes, for example, an anode and a cathode, and is capable of causing a power-generating reaction between a hydrogen-containing gas supplied to the anode and an oxidizing gas supplied to the cathode. The hydrogen-containing gas may be supplied from the reformer (not shown). The oxidizing gas may be air, for example.

The reformer may generate the hydrogen-containing gas by using the raw material. Specifically, in the reformer, the hydrogen-containing gas may be generated by causing a reforming reaction of the raw material gas. The reforming reaction may be any type of reforming reaction. Examples of the reforming reaction include a steam reforming reaction, an autothermal reaction, and a partial oxidation reaction. Other than the raw material, examples of reaction gases used in the reforming reaction include steam, air, and oxygen.

The reformer is, for example, a container filled with a reforming catalyst. For example, an alumina support impregnated with at least one of nickel, ruthenium, platinum, and rhodium can be used as the reforming catalyst. It should be noted that the reforming catalyst is not limited to this example, but may be any catalyst that is capable of causing a progress in the reforming reaction when the temperature of the reforming catalyst is kept within an optimal temperature range.

The fuel cell system may include, as necessary, devices required for the reforming reaction although they are not shown in FIG. 1. For example, if the reforming reaction is a steam reforming reaction, the fuel cell system may include a combustor configured to heat the reformer and an evaporator configured to generate steam. A fuel for the combustor may be any kind of fuel. For example, the hydrogen-containing gas discharged from the reformer may be used as the fuel for the combustor. A heat source for generating the steam is not particularly limited. Examples of the heat source include the combustor, an electric heater, the reformer, the fuel cell, and a combination of any of these. If the reforming reaction is a partial oxidation reaction, the fuel cell system may further include an air supply device (not shown) configured to supply air to the reformer.

The solid oxide fuel cell 10 includes, for example, a stack in which a plurality of single fuel cells are connected in series. In each single fuel cell, a power-generating reaction is caused between the anode and the cathode to generate electric power. The solid oxide fuel cell 10 may include a stack in which cylindrical cells are connected in series. The stack may be a sealed stack, from which an anode off gas and a cathode off gas are discharged without being mixed together, or may be an open stack, from which the anode off gas and the cathode off gas are discharged after being mixed together. In the case of an open stack, the anode off gas and the cathode off gas may be mixed together by the mixer positioned immediately following the stack, and then combusted.

For example, each single fuel cell may adopt a known configuration in which yttria-stabilized zirconia (YSZ) is used for, for example, an electrolyte. Zirconia doped with ytterbium or scandium, or lanthanum gallate-based solid electrolyte, can be used as a material of the single fuel cell. In the case of a single fuel cell in which yttria-stabilized zirconia is used, the power-generating reaction is caused within a temperature range of, for example, about 500° C. to 900° C. although the temperature range also depends on the thickness of the electrolyte.

Electric power obtained from the power generation by the solid oxide fuel cell 10 is supplied to an external load via a terminal that is not shown.

The mixer 24 mixes the anode off gas discharged from the anode gas passage 16 and the cathode off gas discharged from the cathode gas passage 20. For example, in the external space of the stack including cylindrical cells connected in series, the space near a gas exhaust port of the stack can serve as the mixer 24. Alternatively, for example, in the external space of the stack including cylindrical cells connected in series, the space where gas flowing outside the stack and gas discharged from the inside of the stack through the gas exhaust port are mixed together can serve as the mixer 24. The mixer 24 may be the combustor, or the combustor may be provided downstream of the mixer 24. The combustor is an area where the hydrogen-containing gas that has not been utilized for the power generation by the solid oxide fuel cell 10 and the oxidizing gas are brought into flaming combustion. An ignitor is provided in the combustor. The hydrogen-containing gas that has been introduced into the combustor is ignited by the ignitor, and thereby brought into flaming combustion together with the oxidizing gas. As a result of the flaming combustion, necessary heat is generated in the fuel cell unit 12, and a flue gas is generated. The generated flue gas is released to the outside of the system through an exhaust gas passage, which will be described below.

That is, in the fuel cell unit 12, while the solid oxide fuel cell 10 is generating electric power, the hydrogen-containing gas discharged from the anode side and the oxidizing gas discharged from the cathode side are brought into flaming combustion in the combustor, and thereby a large amount of heat and a high-temperature flue gas are generated. The exhaust heat of the flue gas generated as a result of the flaming combustion is used in the fuel cell unit 12 for keeping the temperature of the solid oxide fuel cell 10 to a suitable temperature for the power-generating reaction and heating the reformer to a suitable temperature for the reforming reaction.

The flue gas is released to the outside of the system through the exhaust gas passage. In order to effectively utilize the thermal energy of the high-temperature flue gas, for example, a heat exchanger is provided on the exhaust gas passage. At the heat exchanger, the flue gas exchanges heat with the oxidizing gas supplied to the cathode, thereby increasing the temperature of the oxidizing gas. This makes it possible to improve energy utilization in the operation.

The power-generating raw material supply device 14 supplies the power-generating raw material to the fuel cell unit 12. For example, the power-generating raw material supply device 14 is constituted by a booster and a flow rate adjusting valve. Alternatively, the power-generating raw material supply device 14 may be constituted by either one of these. As one example, a fixed displacement pump is used as the booster. However, the booster is not limited to a fixed displacement pump. The power-generating raw material is supplied from a power-generating raw material source. The power-generating raw material source may have a predetermined supply pressure. Examples of the power-generating raw material source having a predetermined supply pressure include a raw material gas canister and a raw material gas infrastructure.

The power-generating raw material may be hydrogen gas, or may be a substance containing an organic compound whose constituent elements are at least carbon and hydrogen. Specific examples of the power-generating raw material include: hydrocarbons such as hydrogen gas, natural gas, city gas, LPG, LNG, propane gas, butane gas, and any gas containing methane as its major component; alcohols such as methanol and ethanol; and kerosene. The city gas refers to a gas that is supplied from a gas company to households and the like through piping. In the case of using a liquid power-generating raw material such as kerosene or an alcohol, the power-generating raw material may be heated and vaporized before the power-generating raw material is supplied to the reformer.

The combustible gas passage 18 is a passage extending from the power-generating raw material supply device 14 to the downstream end of the anode gas passage 16.

The oxidizing gas supply device 22 supplies the oxidizing gas to the cathode gas passage 20. The oxidizing gas supply device 22 may be a sirocco fan, for example. The oxidizing gas may be air, for example.

After the power generation by the fuel cell unit 12 is stopped, the controller 50 controls the power-generating raw material supply device 14 to supply the power-generating raw material in a volume more than or equal to the volume of the combustible gas passage 18 to the combustible gas passage 18, and concurrently, controls the oxidizing gas supply device 22 to supply the oxidizing gas to the cathode gas passage 20.

The term "concurrently" herein is defined as follows: the start and/or the end of the supply of the power-generating raw material need not coincide or overlap with the start and/or the end of the supply of the oxidizing gas; and it will suffice if both the supply of the power-generating raw material and the supply of the oxidizing gas are performed after the stop of the power generation. The supply of the power-generating raw material and the supply of the oxidizing gas may be continued from before the stop of the power generation. The timing of the supply of the power-generating raw material and the timing of the supply of the oxidizing gas may coincide with each other at least partially.

According to the above-described control, after the power generation by the fuel cell unit 12 is stopped, the combustible gas passage 18 is purged with the power-generating raw material. Here, the dry power-generating raw material is supplied, and thereby the gas remaining in the combustible gas passage 18, i.e., high dew point gas, is purged. As a result, the dew point in the combustible gas passage 18 drops. Since the possibility of generation of condensation water in the combustible gas passage 18 is reduced, the possibility of anode degradation due to condensation water is reduced.

When the power-generating raw material is supplied to the combustible gas passage 18 after the power generation by the fuel cell unit 12 is stopped, there is a possibility that the power-generating raw material flows out of the combustible gas passage 18 to the mixer 24. If the power-generating raw material comes into contact with the cathode in the cathode gas passage 20 through the mixer 24, it may cause cathode degradation due to reduction. According to the above-described control, even if the power-generating raw material flows out of the combustible gas passage 18 to the mixer 24, the power-generating raw material is less likely to come into contact with the cathode since the oxidizing gas is supplied to the cathode gas passage 20. This makes it possible to reduce the possibility of cathode degradation due to reduction.

The controller 50 may be any device, so long as the controller has control functions. The controller 50 includes an arithmetic processing unit and a storage unit storing control programs. Examples of the controller 50 include a microcontroller and PLC (Programmable Logic Controller). Examples of the arithmetic processing unit include an MPU and CPU. The storage unit is a memory, for example. The controller 50 may be configured as a single controller performing centralized control, or may be configured as a group of multiple controllers performing distributed control in cooperation with each other.

The controller 50 may control the oxidizing gas supply device 22 such that the volume of the oxidizing gas supplied to the cathode gas passage 20 after the power generation by the fuel cell unit 12 is stopped is more than or equal to the volume of the cathode gas passage 20.

According to the above-described control, even if the power-generating raw material flows out of the combustible gas passage 18 to the mixer 24, the power-generating raw material is less likely to come into contact with the cathode since a sufficient amount of oxidizing gas is supplied to the cathode gas passage 20. This makes it possible to more effectively reduce the possibility of cathode degradation due to reduction. Even in a case where combustible gases such as the power-generating raw material and the anode off gas are discharged to the outside of the solid oxide fuel cell system, these combustible gases can be diluted by the oxidizing gas before being discharged to the outside of the system.

The controller 50 may control the oxidizing gas supply device such that the supply of the oxidizing gas to the cathode gas passage 20 is continued even after the supply of the power-generating raw material to the combustible gas passage 18 is stopped after the stop of the power generation by the fuel cell unit 12.

According to the above-described control, even if the power-generating raw material flows out of the combustible gas passage 18 to the mixer 24, the power-generating raw material can be prevented from coming into contact with the cathode since the supply of the oxidizing gas to the cathode gas passage 20 is continued. This makes it possible to more effectively reduce the possibility of cathode degradation due to reduction. In addition, the fuel cell unit 12 can be cooled down more quickly by utilizing the oxidizing gas.

The mixer 24 may include an ignitor configured to ignite and combust a mixed gas of the anode off gas and the cathode off gas. The controller 50 may control the ignitor to ignite and combust the mixed gas of the anode off gas and the cathode off gas after the power generation by the fuel cell unit 12 is stopped.

According to the above-described configuration, even in a case where the mixed gas is a combustible gas, the combustible gas is combusted and then discharged as a flue gas. This makes it possible to reduce the possibility that the combustible gas is directly discharged to the outside of the solid oxide fuel cell system 1.

In this case, the ignitor may be provided in a predetermined area of the mixer 24, and thereby the combustor may be realized. The combustor mixes the anode off gas and the cathode off gas, and combusts the mixed gas. The combustor may be configured to be able to heat the reformer by using the combustion heat and the heat of the flue gas.

After the power generation by the fuel cell unit 12 is stopped, the controller 50 may start the supply of the power-generating raw material to the combustible gas passage 18 when the temperature of the solid oxide fuel cell 10 is not lower than 100° C. and not higher than 400° C. The lower limit of the temperature range may be set for the purpose of, for example, reducing the possibility of the generation of condensation water. The upper limit of the temperature range may be set for the purpose of, for example, reducing the possibility that the performance of the catalysts of the desulfurizer, the reformer, and the fuel cell degrades due to carbon deposition, and also reducing the possibility that the combustible gas passage becomes blocked due to carbon deposition.

After the power generation by the fuel cell unit 12 is stopped, the controller 50 may start the supply of the power-generating raw material to the combustible gas passage 18 when the temperature of the solid oxide fuel cell 10 is not lower than 120° C. and not higher than 160° C.

In order to reduce the possibility of carbon deposition, the upper limit of the aforementioned temperature range may be set to 300° C.

After the power generation by the fuel cell unit 12 is stopped, the controller 50 may stop the supply of the power-generating raw material to the combustible gas passage 18 when the temperature of the solid oxide fuel cell 10 has decreased to a predetermined temperature. The predetermined temperature may be set to, for example, 150° C., 120° C., or 100° C.

For example, the temperature of the solid oxide fuel cell 10 may be indirectly obtained by detecting the temperature of the gas flowing through the combustible gas passage 18. Specifically, the solid oxide fuel cell system according to Embodiment 1 is configured such that the temperature of the solid oxide fuel cell 10 and the temperature of the combustible gas passage 18 in the fuel cell unit 12 are substantially the same. Accordingly, after the power generation by the fuel cell unit 12 is stopped, when the temperature of the solid oxide fuel cell 10 is not lower than 100° C. and not higher than 400° C., the temperature of the gas flowing through the combustible gas passage 18 in the fuel cell unit 12 is also not lower than 100° C. and not higher than 400° C. Therefore, by detecting the temperature of the gas flowing through the combustible gas passage 18 in the fuel cell unit 12, the temperature of the solid oxide fuel cell 10 can be obtained indirectly. However, there may be a case where the solid oxide fuel cell system is configured such that the temperature of the solid oxide fuel cell 10 and the temperature of the combustible gas passage 18 in the fuel cell unit 12 are not substantially the same. In this case, after the power generation by the fuel cell unit 12 is stopped, the controller 50 may start the supply of the power-generating raw material to the combustible gas passage 18 when the temperature of the solid oxide fuel cell 10 is not lower than 100° C. and not higher than 400° C. and the temperature of the gas flowing through the combustible gas passage 18 in the fuel cell unit 12 is also not lower than 100° C. and not higher than 400° C.

A desulfurizer configured to remove sulfur compounds from the power-generating raw material may be provided on the combustible gas passage 18 extending from the power-generating raw material supply device 14 to the solid oxide fuel cell 10. In a case where the reformer is provided on the combustible gas passage 18 extending from the power-generating raw material supply device 14 to the solid oxide fuel cell 10, the desulfurizer configured to remove sulfur compounds from the power-generating raw material may be provided on a part of the combustible gas passage 18, the part extending from the power-generating raw material supply device 14 to the reformer.

The sulfur compounds may be those artificially added to the raw material as odorant components, or may be natural sulfur compounds originally contained in the raw material. Specific examples of the sulfur compounds include tertiary-butylmercaptan (TBM), dimethyl sulfide (DMS), tetrahydrothiophene (THT), carbonyl sulfide (COS), and hydrogen sulfide.

The desulfurizer may be either a hydrodesulfurizer or an ordinary-temperature desulfurizer.

The hydrodesulfurizer is a container filled with a hydrodesulfurization agent. For example, the hydrodesulfurization agent is a CuZn-based catalyst having a function of converting sulfur compounds into hydrogen sulfide and a function of adsorbing the hydrogen sulfide. However, the hydrodesulfurization agent is not limited to this example. The hydrodesulfurization agent may be constituted by: a CoMo-based catalyst for converting sulfur compounds in the raw material gas into hydrogen sulfide; and a ZnO-based catalyst or a CuZn-based catalyst provided downstream of the CoMo-based catalyst, the ZnO-based catalyst and the CuZn-based catalyst being sulfur adsorbents for adsorbing and removing the hydrogen sulfide from the raw material gas.

There is a case where the hydrodesulfurization agent contains nickel (Ni) as a catalyst metal. In this case, if the raw material and recycle gas are fed to the hydrodesulfurization agent before the hydrodesulfurizer is warmed up, i.e., when the temperature of the hydrodesulfurizer is low (e.g., lower than 150° C.), there is a possibility that nickel carbonyl gas is generated. In order to reduce the possibility of the generation of the nickel carbonyl gas, a temperature detector (not shown) or the like may be used to detect the temperature of the hydrodesulfurization agent in the desulfurizer, and only when the temperature of the hydrodesulfurization agent in the desulfurizer has become a predetermined temperature or higher, the power-generating raw material may be supplied to the hydrodesulfurizer.

The ordinary-temperature desulfurizer removes sulfur compounds from the raw material at ordinary temperatures. The term "ordinary temperatures" herein means temperatures that are relatively closer to the ordinary temperature range than the operating temperatures of the hydrodesulfurizer (the operating temperatures are, for example, close to 300° C.), and the ordinary temperatures herein cover the ordinary temperature range and temperatures at which the desulfurization agent used in the ordinary-temperature desulfurizer can effectively function as a desulfurization agent.

In a case where the hydrodesulfurization agent contains copper and zinc, a proper operating temperature range for the hydrodesulfurizer is, for example, about 150° C. to 350° C. In the case of adopting an adsorption desulfurization agent, for example, a Ag zeolite-based catalyst is used, and the desulfurizer is used at ordinary temperatures.

[Stopping Method]

Figure 2:
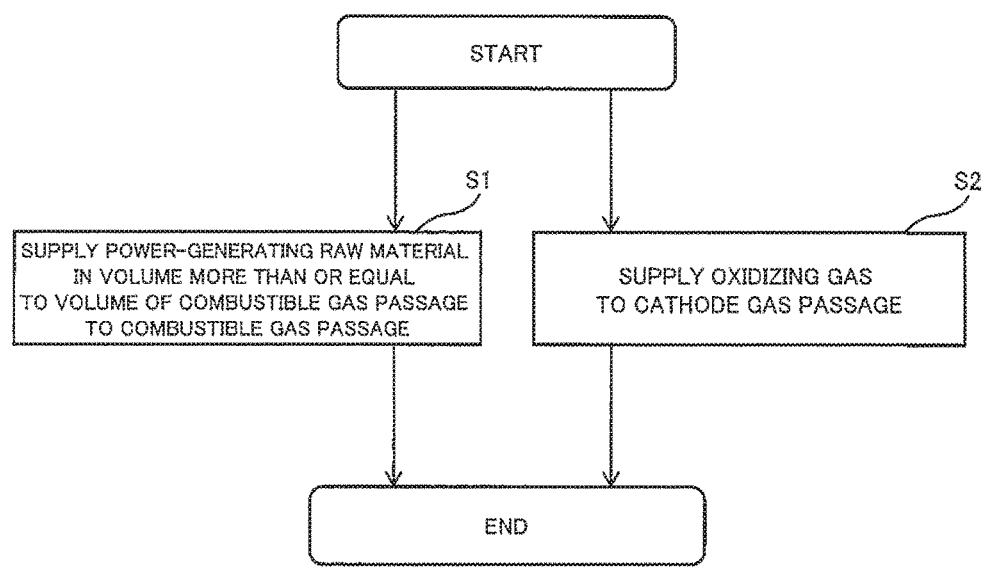
FIG. 2 is a flowchart showing one example of a method of stopping the solid oxide fuel cell system according to Embodiment 1.

FIG. 2 is a flowchart showing one example of a method of stopping the solid oxide fuel cell system according to Embodiment 1. Hereinafter, the method of stopping the solid oxide fuel cell system according to Embodiment 1 is described with reference to FIG. 2. The stopping method shown in FIG. 2 may be executed through, for example, the control of the power-generating raw material supply device 14 and the oxidizing gas supply device 22 by the controller 50.

When the power generation by the fuel cell unit 12 is stopped (START), the power-generating raw material supply device 14 supplies the power-generating raw material in a volume more than or equal to the volume of the combustible gas passage 18 to the combustible gas passage 18 (step S1). Concurrently, the oxidizing gas supply device 22 supplies the oxidizing gas to the cathode gas passage 20 (step S2), and then the stopping operation is ended (END).

The order in which the supply of the power-generating raw material (step S1) and the supply of the oxidizing gas (step S2) are performed is not particularly limited. The latter may be started earlier than the former, or both the steps may be started concurrently.

[Variation 1]

Figure 3:
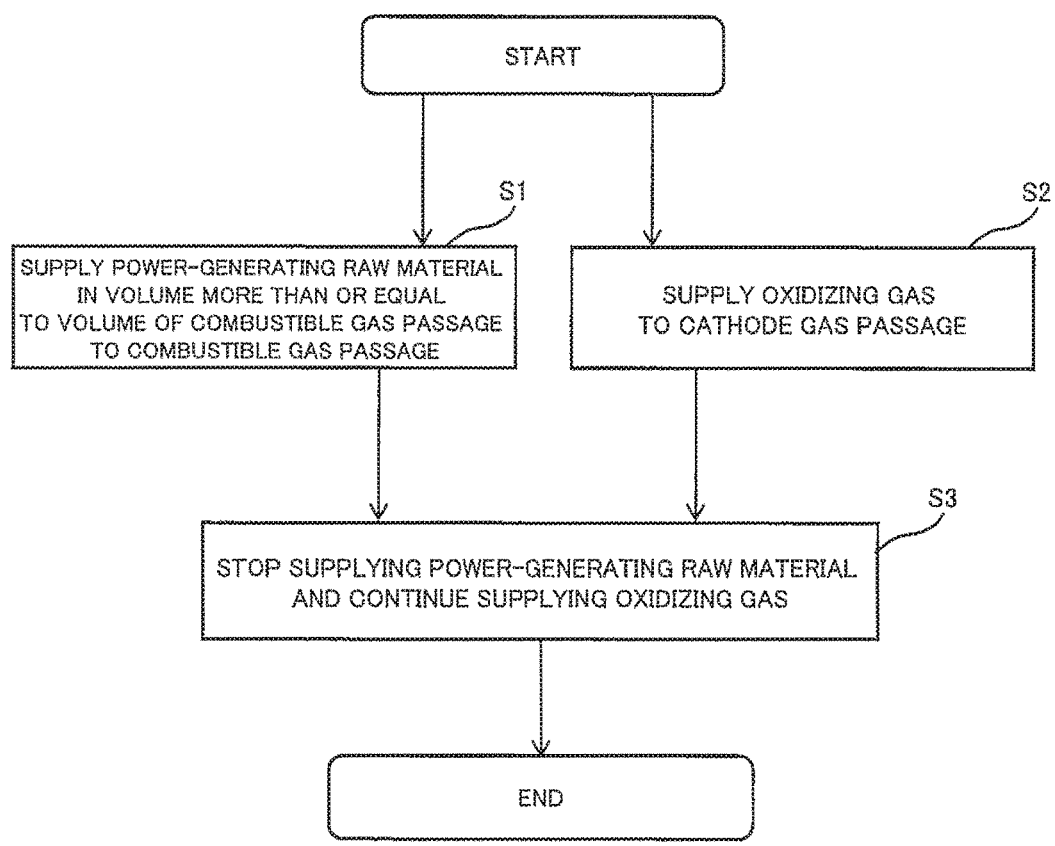
FIG. 3 is a flowchart showing one example of a method of stopping the solid oxide fuel cell system according to Variation 1.

FIG. 3 is a flowchart showing one example of a method of stopping the solid oxide fuel cell system according to Variation 1. Hereinafter, the method of stopping the solid oxide fuel cell system according to Variation 1 is described with reference to FIG. 3. The stopping method shown in FIG. 3 may be executed through, for example, the control of the power-generating raw material supply device 14 and the oxidizing gas supply device 22 by the controller 50.

When the power generation by the fuel cell unit 12 is stopped (START), the power-generating raw material supply device 14 supplies the power-generating raw material in a volume more than or equal to the volume of the combustible gas passage 18 to the combustible gas passage 18 (step S1). Concurrently, the oxidizing gas supply device 22 supplies the oxidizing gas to the cathode gas passage 20 (step S2). Then, the supply of the power-generating raw material to the combustible gas passage 18 is stopped while the supply of the oxidizing gas to the cathode gas passage 20 is continued (step S3). Thereafter, the stopping operation is ended (END).

The order in which the supply of the power-generating raw material (step S1) and the supply of the oxidizing gas (step S2) are performed is not particularly limited. The latter may be started earlier than the former, or both the steps may be started concurrently. How long the supply of the oxidizing gas is continued after the supply of the power-generating raw material is stopped is not particularly limited.

[Variation 2]

Figure 4:
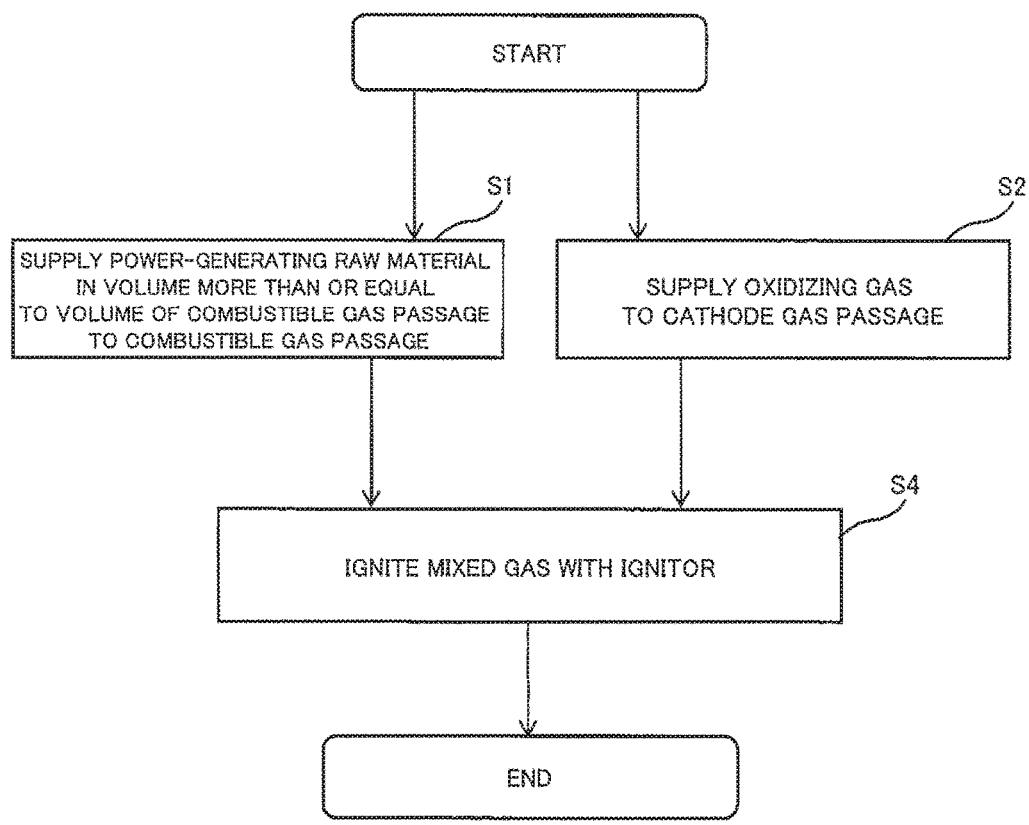
FIG. 4 is a flowchart showing one example of a method of stopping the solid oxide fuel cell system according to Variation 2.

FIG. 4 is a flowchart showing one example of a method of stopping the solid oxide fuel cell system according to Variation 2. Hereinafter, the method of stopping the solid oxide fuel cell system according to Variation 2 is described with reference to FIG. 4. The stopping method shown in FIG. 4 may be executed through, for example, the control of the power-generating raw material supply device 14 and the oxidizing gas supply device 22 by the controller 50. It should be noted that Variation 2 exemplifies the above-described case where the combustor of the mixer 24 is provided with an ignitor.

When the power generation by the fuel cell unit 12 is stopped (START), the power-generating raw material supply device 14 supplies the power-generating raw material in a volume more than or equal to the volume of the combustible gas passage 18 to the combustible gas passage 18 (step S1). Concurrently, the oxidizing gas supply device 22 supplies the oxidizing gas to the cathode gas passage 20 (step S2).

Then, the ignitor ignites the mixed gas (step S3). Thereafter, the stopping operation is ended (END).

The order in which the supply of the power-generating raw material (step S1), the supply of the oxidizing gas (step S2), and the ignition by the ignitor (step S3) are performed is not particularly limited. These steps may be performed in any order. Two of these steps or all of the three steps may be performed concurrently.

Example 1

Figure 5:
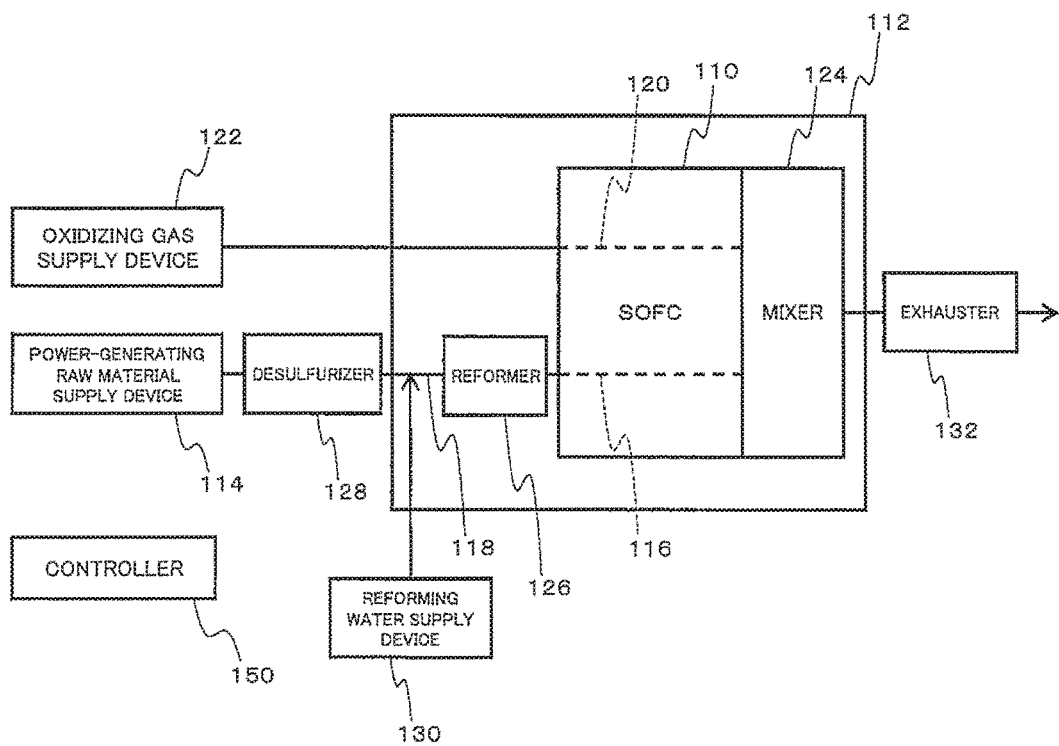
FIG. 5 is a block diagram showing a schematic configuration of a solid oxide fuel cell system according to Example 1.

FIG. 5 is a block diagram showing a schematic configuration of a solid oxide fuel cell system according to Example 1. Hereinafter, a solid oxide fuel cell system 100 according to Example 1 is described with reference to FIG. 5.

In the example shown in FIG. 5, the solid oxide fuel cell system 100 includes: a fuel cell unit 112 including a solid oxide fuel cell 110, a mixer 124, and a reformer 126; a power-generating raw material supply device 114; a desulfurizer 128; a combustible gas passage 118; an oxidizing gas supply device 122; a reforming water supply device 130; an exhauster 132; and a controller 150.

The reformer 126 may generate a hydrogen-containing gas by using a raw material. Specifically, the reformer 126 may cause a reforming reaction of a raw material gas, thereby generating a hydrogen-containing gas. The reforming reaction may be any type of reforming reaction. Examples of the reforming reaction include a steam reforming reaction, an autothermal reaction, and a partial oxidation reaction.

The reforming water supply device 130 supplies water necessary for the reforming reaction in the reformer 126. The water may be ion-exchanged municipal water, for example.

The fuel cell system may include, as necessary, devices required for the reforming reaction although they are not shown in FIG. 5. For example, if the reforming reaction is a steam reforming reaction, the fuel cell system may include a combustor configured to heat the reformer 126 and an evaporator configured to generate steam. A fuel for the combustor may be any kind of fuel. For example, the hydrogen-containing gas discharged from the reformer 126 may be used as the fuel for the combustor. A heat source for generating the steam is not particularly limited. Examples of the heat source include the combustor, an electric heater, the reformer, the fuel cell, and a combination of any of these. If the reforming reaction is a partial oxidation reaction, the fuel cell system may further include an air supply device (not shown) configured to supply air to the reformer 126.

The desulfurizer 128 is an ordinary-temperature desulfurizer configured to remove sulfur compounds from the raw material at ordinary temperatures. The desulfurizer 128 may be disposed outside the fuel cell unit 112. Since the configuration of the ordinary-temperature desulfurizer may be the same as that described above in Embodiment 1, a detailed description thereof is omitted.

The exhauster 132 discharges exhaust gas discharged from the mixer 124.

Other than the above-described points, the solid oxide fuel cell 110, the mixer 124, the fuel cell unit 112, the power-generating raw material supply device 114, the desulfurizer 128, the combustible gas passage 118, the oxidizing gas supply device 122, and the controller 150 may have the same configurations as those of the solid oxide fuel cell 10, the mixer 24, the fuel cell unit 12, the power-generating raw material supply device 14, the desulfurizer 128, the combustible gas passage 18, the oxidizing gas supply device 22, and the controller 50, respectively. Therefore, a detailed description of these components in the solid oxide fuel cell system 100 is omitted.

Figure 6:
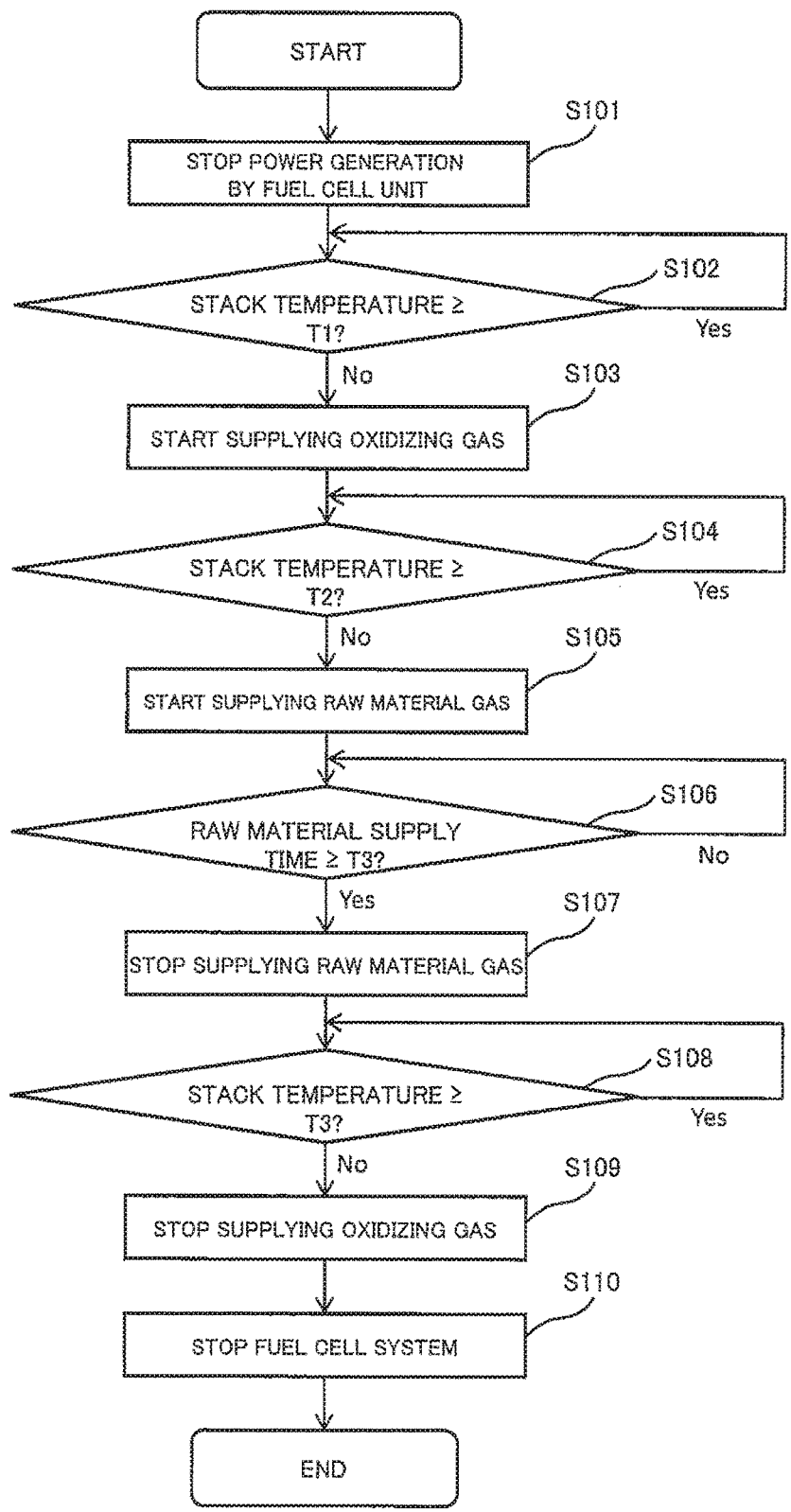
FIG. 6 is a flowchart showing a method of stopping the solid oxide fuel cell system according to Example 1.

FIG. 6 is a flowchart showing one example of a method of stopping the solid oxide fuel cell system according to Example 1. Hereinafter, the method of stopping the solid oxide fuel cell system according to Example 1 is described with reference to FIG. 6. The stopping method shown in FIG. 6 may be executed through, for example, the control of the power-generating raw material supply device 114 and the oxidizing gas supply device 122 by the controller 150.

When an instruction to stop the power generation by the fuel cell unit 112 is given (START), first, the power generation by the fuel cell unit 112 is stopped (step S101), and the supply of the power-generating raw material and the supply of the oxidizing gas are stopped. Specifically, "the power generation by the fuel cell unit 112 is stopped" may mean, for example, that the extraction of electric power from the fuel cell unit 112 is stopped. The supply of the oxidizing gas may be stopped when a predetermined time (e.g., several minutes) has elapsed after the stop of the supply of the power-generating raw material.

Thereafter, when a stack temperature (i.e., the temperature of the solid oxide fuel cell 110; the same applies hereinafter) has decreased below T1 (No in step S102), the oxidizing gas supply device 22 starts supplying the oxidizing gas to the cathode gas passage 20 (step S103). T1 may be set to 300° C., for example.

Subsequently, when the stack temperature has decreased below T2 (No in step S102), the power-generating raw material supply device 14 starts supplying the power-generating raw material to the combustible gas passage 18 (step S105). It should be noted that the power-generating raw material in Example 1 is a raw material gas such as LNG. T2 may be set to 150° C., for example.

Then, the supply of the power-generating raw material is continued until a raw material supply time (a time that has elapsed from the starting time of the supply of the raw material gas in step S105) reaches t3. The time t3 is suitably set such that the supply amount (volume) of the power-generating raw material supplied to the combustible gas passage 18 becomes more than or equal to the volume of the combustible gas passage 18. In a case where the power-generating raw material is liquid, the supply amount of the power-generating raw material may be the volume of gas generated as a result of vaporization of the power-generating raw material. When the raw material supply time has reached t3 or more (Yes in step S106), the supply of the power-generating raw material is stopped (step S107).

Thereafter, when the stack temperature has decreased below T3 (No in step S108), the supply of the oxidizing gas is stopped (step S109) and the solid oxide fuel cell system 100 is stopped from operating (step S110), and thereby the stopping operation is ended (END). T3 may be set to 90° C., for example.

In the above-described example, it is determined based on the raw material supply time whether or not the supply amount (volume) of the power-generating raw material supplied to the combustible gas passage 18 has become more than or equal to the volume of the combustible gas passage 18. However, the determination may be performed in a different manner. For example, the supply amount of the power-generating raw material may be calculated by taking account of not only the raw material supply time but also an operating amount that has been outputted to the power-generating raw material supply device 114.

Embodiment 2

A solid oxide fuel cell system according to Embodiment 2 is configured such that, in the solid oxide fuel cell system according to Embodiment 1, the fuel cell unit includes a hydrodesulfurizer operative to remove a sulfur compound from the power-generating raw material supplied from the power-generating raw material supply device.

According to the above configuration, the possibility of desulfurization catalyst degradation due to condensation water is reduced. This makes it possible to improve the durability of the solid oxide fuel cell system including the hydrodesulfurizer.

[Apparatus Configuration]

Figure 7:
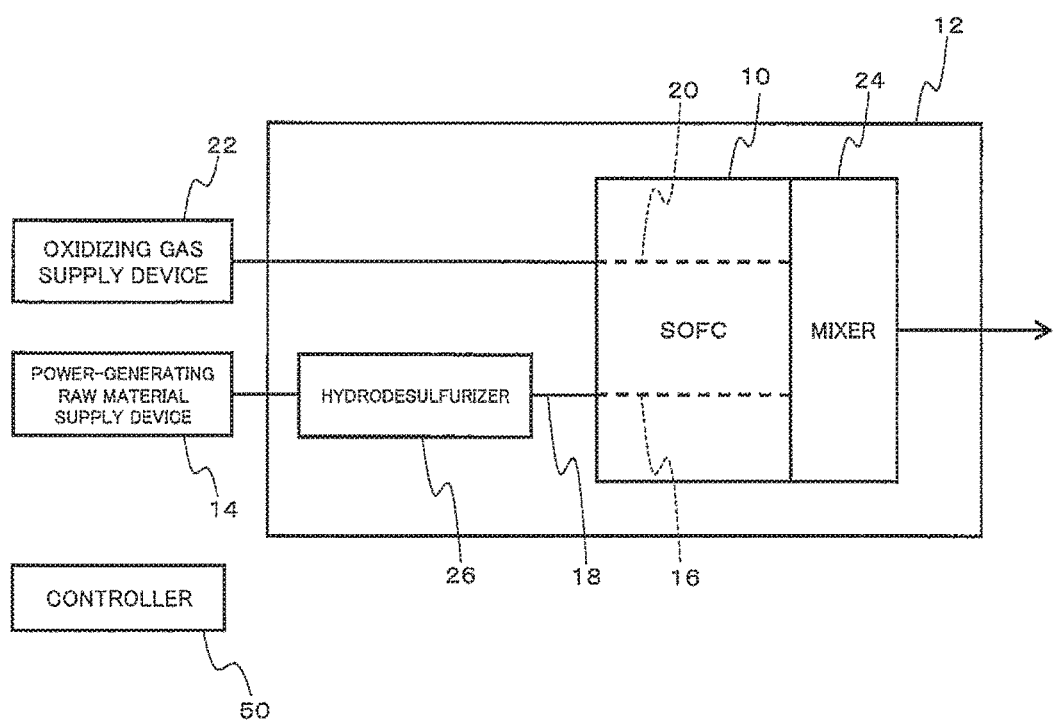
FIG. 7 is a block diagram showing one example of a schematic configuration of a solid oxide fuel cell system according to Embodiment 2.

FIG. 7 is a block diagram showing one example of a schematic configuration of the solid oxide fuel cell system according to Embodiment 2. Hereinafter, a solid oxide fuel cell system 2 according to Embodiment 2 is described with reference to FIG. 7.

In the example shown in FIG. 7, the solid oxide fuel cell system 2 includes a hydrodesulfurizer 26.

The hydrodesulfurizer 26 removes sulfur compounds from the power-generating raw material supplied from the power-generating raw material supply device 14. In the example shown in FIG. 7, the hydrodesulfurizer 26 is provided on the combustible gas passage 18 extending from the power-generating raw material supply device 14 to the solid oxide fuel cell 10.

The solid oxide fuel cell 10 may generate electric power by directly using the power-generating raw material that has been desulfurized by the hydrodesulfurizer 26, or by using a reformed gas that is obtained by reforming, by a reformer or the like, the power-generating raw material that has been desulfurized by the hydrodesulfurizer 26.

The hydrodesulfurizer 26 is a container filled with a hydrodesulfurization agent. For example, the hydrodesulfurization agent is a CuZn-based catalyst having a function of converting sulfur compounds into hydrogen sulfide and a function of adsorbing the hydrogen sulfide. However, the hydrodesulfurization agent is not limited to this example. The hydrodesulfurization agent may be constituted by: a CoMo-based catalyst for converting sulfur compounds in the raw material gas into hydrogen sulfide; and a ZnO-based catalyst or a CuZn-based catalyst provided downstream of the CoMo-based catalyst, the ZnO-based catalyst and the CuZn-based catalyst being sulfur adsorbents for adsorbing and removing the hydrogen sulfide from the raw material gas.

After the power generation by the fuel cell unit 12 is stopped, the controller 50 controls the power-generating raw material supply device 14 to supply the power-generating raw material in a volume more than or equal to the volume of the combustible gas passage 18 to the combustible gas passage 18, and concurrently, controls the oxidizing gas supply device 22 to supply the oxidizing gas to the cathode gas passage 20. After the power generation is stopped, the power-generating raw material supplied from the power-generating raw material supply device 14 flows into the solid oxide fuel cell 10 through the hydrodesulfurizer 26.

According to the above-described control, after the power generation by the fuel cell unit 12 is stopped, the combustible gas passage 18 is purged with the power-generating raw material. Here, the dry power-generating raw material is supplied, and thereby the gas remaining in the combustible gas passage 18, i.e., high dew point gas, is purged. As a result, the dew point in the combustible gas passage 18 drops. Since the possibility of generation of condensation water in the combustible gas passage 18 is reduced, the possibility of degradation of the catalyst in the hydrodesulfurizer 26 due to condensation water is reduced.

Other than the above-described points, the solid oxide fuel cell system 2 according to Embodiment 2 may be the same as the solid oxide fuel cell system according to Embodiment 1 shown in FIG. 1. Therefore, components common between FIG. 7 and FIG. 1 are denoted by the same reference signs and names, and a detailed description of such common components in FIG. 7 is omitted.

[Stopping Method]

Since a method of stopping the solid oxide fuel cell system according to Embodiment 2 may be the same as the stopping method described above in Embodiment 1, a detailed description of the method is omitted.

The same variations as those of Embodiment 1 are applicable to Embodiment 2.

Example 2

Figure 8:
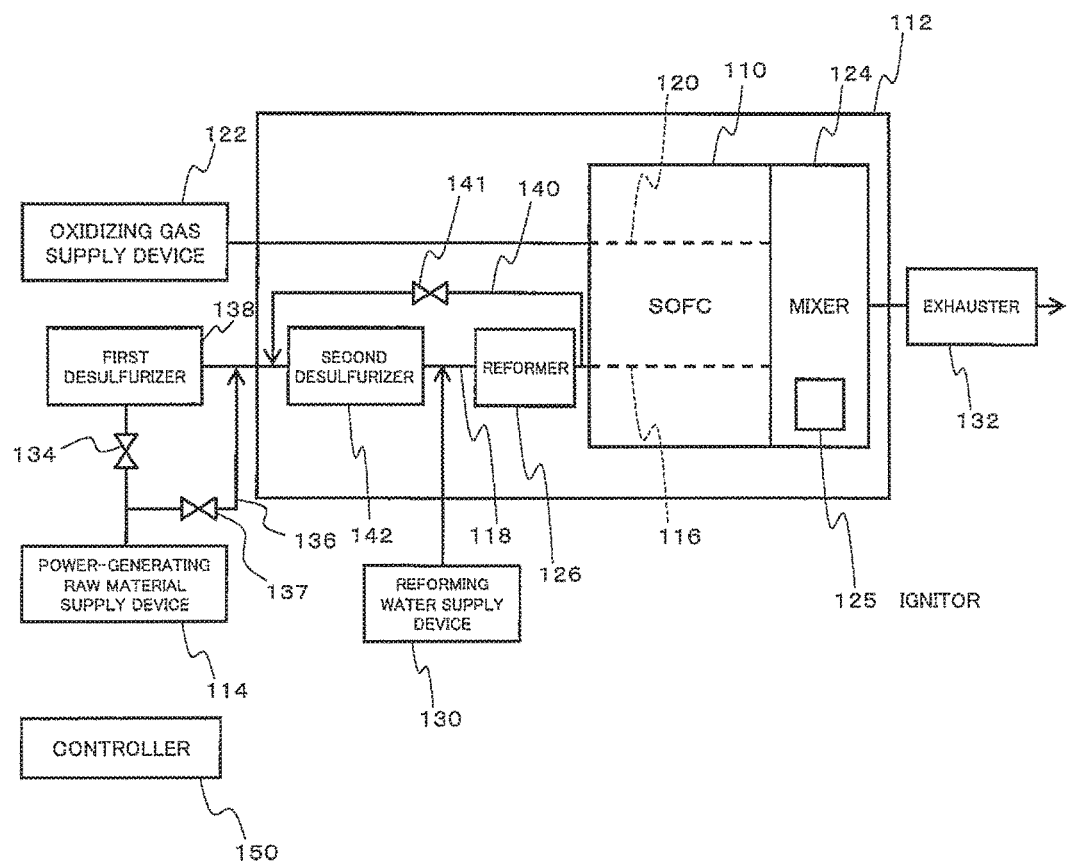
FIG. 8 is a block diagram showing a schematic configuration of a solid oxide fuel cell system according to Example 2.

FIG. 8 is a block diagram showing a schematic configuration of a solid oxide fuel cell system according to Example 2. Hereinafter, a solid oxide fuel cell system 200 according to Example 2 is described with reference to FIG. 8.

In the example shown in FIG. 8, the solid oxide fuel cell system 200 includes a first valve 134, a bypass passage 136, a second valve 137, a first desulfurizer 138, a recycle gas passage 140, a third valve 141, a second desulfurizer 142, and an ignitor 125.

The first valve 134 is provided on a part of the combustible gas passage 118, the part extending from the power-generating raw material supply device 114 to the first desulfurizer 138. The first valve 134 opens and closes the combustible gas passage 118. The opening and closing of the first valve 134 may be controlled by the controller 150.

The bypass passage 136 branches off from a part of the combustible gas passage 118, the part extending from the power-generating raw material supply device 114 to the first valve 134, and connects to the passage downstream of the first desulfurizer 138 in a manner to bypass the first desulfurizer 138.

The second valve 137 is provided on the bypass passage 136, and opens and closes the bypass passage 136. The opening and closing of the second valve 137 may be controlled by the controller 150.

The first desulfurizer 138 is an ordinary-temperature desulfurizer configured to remove sulfur compounds from the raw material at ordinary temperatures. The first desulfurizer 138 may be disposed outside the fuel cell unit 112. Since the configuration of the ordinary-temperature desulfurizer may be the same as that described above in Embodiment 1, a detailed description of the configuration is omitted.

The recycle gas passage 140 branches off from a part of the combustible gas passage 118, the part extending from the reformer 126 to the solid oxide fuel cell 110, and connects to a part of the combustible gas passage 118, the part extending from the bypass passage 136 to the second desulfurizer 142.

The third valve 141 is provided on the recycle gas passage 140, and opens and closes the recycle gas passage 140. The opening and closing of the third valve 141 may be controlled by the controller 150.

The second desulfurizer 142 is a hydrodesulfurizer. The second desulfurizer 142 may be disposed outside the fuel cell unit 112. Since the configuration of the hydrodesulfurizer may be the same as that described above in Embodiments 1 and 2, a detailed description of the configuration is omitted.

The ignitor 125 is provided, for example, inside the mixer 124. The ignitor 125 ignites and combusts a mixed gas that is obtained by mixing the anode off gas and the cathode off gas in the mixer 124. The ignition of the ignitor 125 may be controlled by the controller 150.

Other than the above-described points and omission of the desulfurizer 128, the configuration of the solid oxide fuel cell system 200 may be the same as that of the solid oxide fuel cell system 100 of Example 1. Therefore, components common between FIG. 5 and FIG. 8 are denoted by the same reference signs and names, and a detailed description of such common components in FIG. 8 is omitted.

Figure 9:
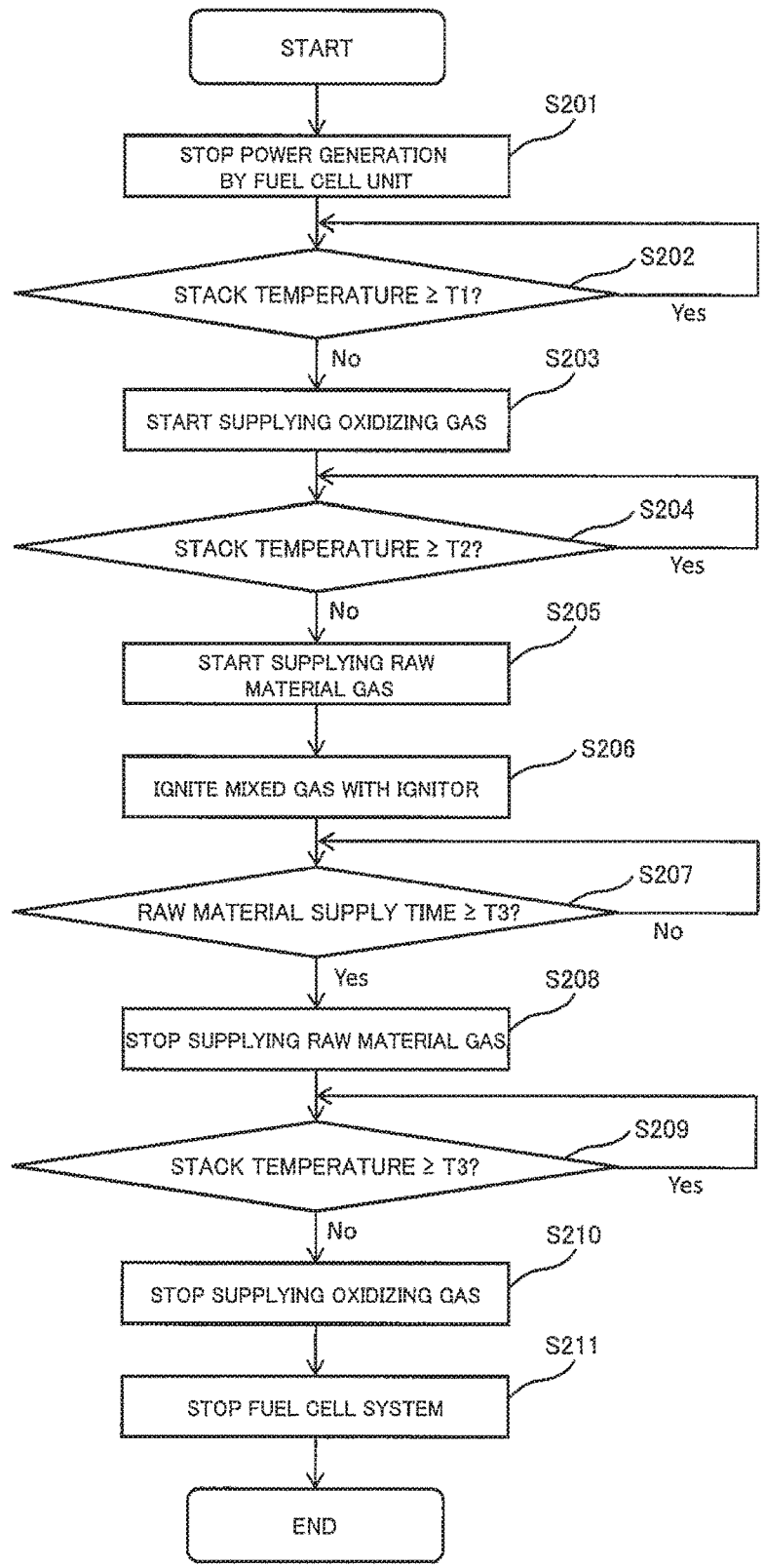
FIG. 9 is a flowchart showing a method of stopping the solid oxide fuel cell system according to Example 2.

FIG. 9 is a flowchart showing a method of stopping the solid oxide fuel cell system according to Example 2. Hereinafter, the method of stopping the solid oxide fuel cell system according to Example 2 is described with reference to FIG. 9. The stopping method shown in FIG. 9 may be executed through, for example, the control of the power-generating raw material supply device 114 and the oxidizing gas supply device 122 by the controller 150.

In FIG. 9, operations performed from when the power generation by the fuel cell unit 112 is stopped (START) to when the power-generating raw material supply device 114 starts supplying the power-generating raw material to the combustible gas passage 118 (step S205) may be the same as the operations from START to step S105 in FIG. 6. Therefore, a detailed description of the operations from step S201 to step S205 is omitted.

When the supply of the power-generating raw material to the combustible gas passage 118 is started in step S205, the mixed gas is ignited by the ignitor 125 (step S206).

Then, the supply of the power-generating raw material is continued until a raw material supply time (a time that has elapsed from the starting time of the supply of the raw material gas in step S205) reaches t3. The time t3 is suitably set such that the supply amount (volume) of the power-generating raw material supplied to the combustible gas passage 18 becomes more than or equal to the volume of the combustible gas passage 18. In a case where the power-generating raw material is liquid, the supply amount of the power-generating raw material may be the volume of gas generated as a result of vaporization of the power-generating raw material. When the raw material supply time has reached t3 or more (Yes in step S207), the supply of the power-generating raw material is stopped (step S208).

Operations performed from step S208 to the end of the stopping operation (END) may be the same as the operations performed from step S107 to the end of the stopping operation (END) in FIG. 6. Therefore, a detailed description of the operations performed from step S208 to step S211 is omitted.

Embodiment 3

In the operation stop process performed at the time of stopping the solid oxide fuel cell system from operating, it is necessary to cool down the components operating at a high temperature, such as the solid oxide fuel cell and the reformer, to a predetermined temperature, and purge the remaining hydrogen-containing gas from the inside of the reformer, the inside of the fuel cell, and the inside of the passage through which the hydrogen-containing gas flows. The reason for this is that since the remaining hydrogen-containing gas contains steam, water condensation occurs when the temperature decreases to the dew point or lower in the cooling process, and the condensation water causes significant durability degradation of the catalyst filling in each of the reformer and the desulfurizer.

In the above-described fuel cell system according to Patent Literature 2, in an operation stop process, after a shutdown stop, when the temperature in the fuel cell module has decreased to a predetermined temperature as a result of performing a temperature drop operation, the supply of air for reforming and air for power generation is resumed. Accordingly, a fuel gas passage including, for example, the reformer, the fuel gas supply pipe, and the manifold, and the anode in each fuel-cell cell unit can be purged with the air. Also, an exhaust gas passage including, for example, the cathode in the power generating chamber, the exhaust passage, and the air heat exchanger can be purged with the air.

The inventors of the present invention conducted diligent studies on the fuel cell system according to Patent Literature 2 previously described in "Background Art", and as a result of the studies, they have obtained findings as described below.

Examples of the reforming reaction in the reformer include a reaction that does not utilize the air for reforming, such as a steam reforming reaction. Accordingly, the fuel cell system is not necessarily configured to supply the air for reforming to the reformer. If such a fuel cell system that does not require the supply of the air for reforming to the reformer is configured such that a passage leading to the cathode and a passage leading to the anode are both purged with air as in Patent Literature 2, then it is necessary to additionally install a mechanism for causing the air to flow through the passage leading to the anode. This results in increase in the size of the system.

In view of the above, the inventors of the present invention have given consideration to a configuration in which the passage leading to the anode is purged not with air but by using the power-generating raw material. This configuration does not require the installation of an additional mechanism for causing the air to flow through the passage leading to the anode for the purpose of purging. This makes it possible to prevent increase in the size of the system. However, in the case of such a fuel cell system in which the purging is performed by using the power-generating raw material, the combustible power-generating raw material is directly discharged to the outside of the fuel cell system after the raw material is used in the purging in an operation stop process. Thus, the inventors have noticed that there is a problem in terms of safety.

Based on the above findings, the inventors of the present invention have found that, after the combustible power-generating raw material is used in the purging, by combusting the raw material before discharging it to the outside of the system, the fuel cell system can be safely stopped from operating. The inventors have also found that, in order to prevent overhearing of the solid oxide fuel cell due to the combustion of the power-generating raw material, it is necessary to devise a suitable manner of combustion of the power-generating raw material so that the temperature of the solid oxide fuel cell will be within a proper temperature range. Specifically, a solid oxide fuel cell system according to Embodiment 3 is configured as described below.

[Apparatus Configuration]

Figure 10:
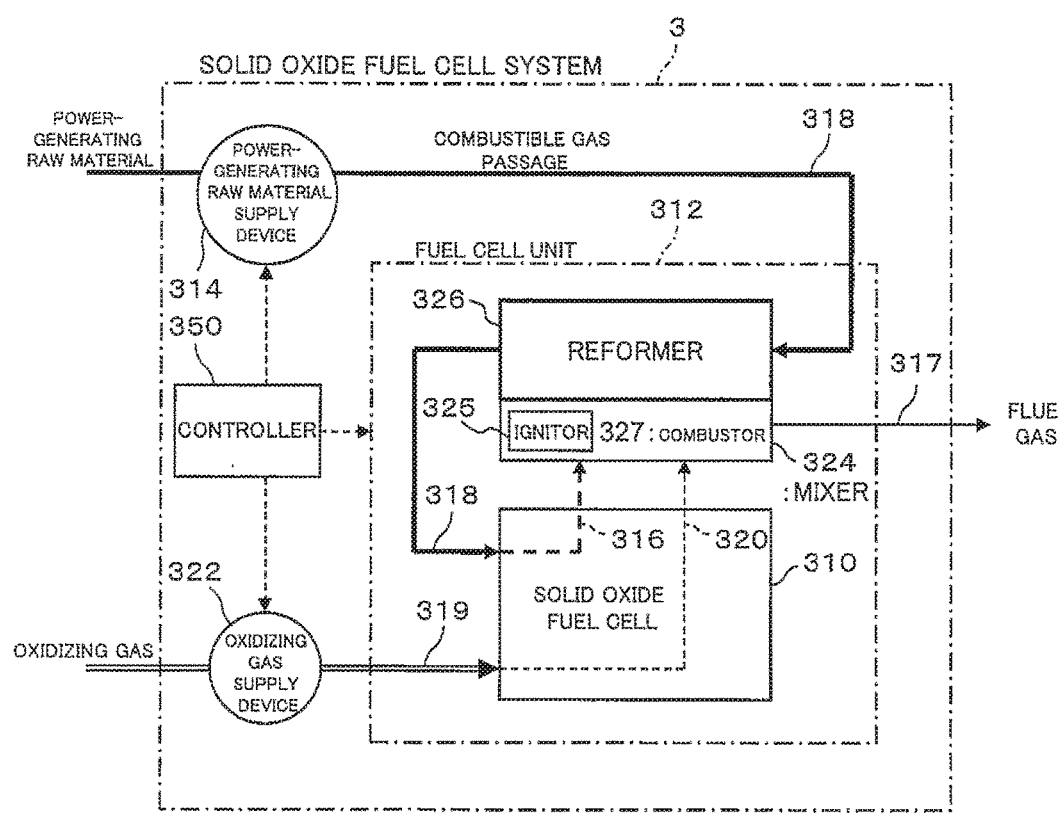
FIG. 10 is a block diagram showing one example of a schematic configuration of a solid oxide fuel cell system according to Embodiment 3 of the present invention.

First, the configuration of a solid oxide fuel cell system 3 according to Embodiment 3 of the present invention is described with reference to FIG. 10. FIG. 10 is a block diagram showing one example of a schematic configuration of the solid oxide fuel cell system 3 according to Embodiment 3 of the present invention.

As shown in FIG. 10, the solid oxide fuel cell system 3 includes: a fuel cell unit 312 including a solid oxide fuel cell 310; a power-generating raw material supply device 314; an oxidizing gas supply device 322; a combustible gas passage 318; an oxidizing gas passage 319; an exhaust gas passage 317; and a controller 312. In addition to the solid oxide fuel cell 310, the fuel cell unit 312 further includes a reformer 326 and a mixer 324. A combustor 327 provided with an ignitor 325 is formed in the mixer 324.

That is, the solid oxide fuel cell system 3 is configured such that the above-described configuration of the solid oxide fuel cell system 1 further includes the combustor 327, which is formed in the mixer 324 and provided with the ignitor 325, and such that the combustor 327 is disposed at a position adjacent to the reformer 326.

Since the power-generating raw material supply device 14, the oxidizing gas supply device 22, and the solid oxide fuel cell 10 included in the solid oxide fuel cell system 1 are the same as the power-generating raw material supply device 314, the oxidizing gas supply device 322, and the solid oxide fuel cell 310 included in the solid oxide fuel cell system 3, the description of these components in the solid oxide fuel cell system 3 is omitted.

As shown in FIG. 10, the solid oxide fuel cell system 3 includes the combustible gas passage 318, through which a combustible gas flows and which extends from the power-generating raw material supply device 314 to the anode of the solid oxide fuel cell 310 through the reformer 326. In FIG. 10, the combustible gas passage 318 corresponds to a section from the power-generating raw material supply device 314 to the downstream end of an anode gas passage 316 of the solid oxide fuel cell 310, through which passage the hydrogen-containing gas flows. That is, the combustible gas passage 318 is a combination of the following passages: a passage for leading the power-generating raw material from the power-generating raw material supply device 314 to the reformer 326; a passage for leading the hydrogen-containing gas, which is generated by reforming the power-generating raw material in the reformer 326, to the solid oxide fuel cell 310; and the anode gas passage 316.

The solid oxide fuel cell system 3 further includes the oxidizing gas passage 319, through which the oxidizing gas flows and which extends from the oxidizing gas supply device 322 to the cathode of the solid oxide fuel cell 310. In FIG. 10, the oxidizing gas passage 319 corresponds to a section from the oxidizing gas supply device 322 to the downstream end of a cathode gas passage 320 of the solid oxide fuel cell 310, through which passage the oxidizing gas flows.

The combustor 327 is an area where the hydrogen-containing gas that has not been utilized for the power generation by the solid oxide fuel cell 310 and the oxidizing gas are brought into flaming combustion. The ignitor 325 is provided in the combustor 327. The hydrogen-containing gas that has been introduced into the combustor 327 is ignited by the ignitor 325, and thereby brought into flaming combustion together with the oxidizing gas. As a result of the flaming combustion, necessary heat is generated in the fuel cell unit 312, and a flue gas is generated. The generated flue gas is released to the outside of the system through the exhaust gas passage 317.

That is, in the fuel cell unit 312, while the solid oxide fuel cell 310 is generating electric power, the hydrogen-containing gas discharged from the anode side and the oxidizing gas discharged from the cathode side are brought into flaming combustion in the combustor 327, and thereby a large amount of heat and a high-temperature flue gas are generated. The exhaust heat of the flue gas generated as a result of the flaming combustion is used in the fuel cell unit 312 for keeping the temperature of the solid oxide fuel cell 310 to a suitable temperature for the power-generating reaction and heating the reformer 326 to a suitable temperature for the reforming reaction.

The flue gas is released to the outside of the system through the exhaust gas passage 317. In order to effectively utilize the thermal energy of the high-temperature flue gas, for example, a heat exchanger is provided on the exhaust gas passage 317. At the heat exchanger, the flue gas exchanges heat with the oxidizing gas supplied to the cathode, thereby increasing the temperature of the oxidizing gas. This makes it possible to improve energy utilization in the operation.

The solid oxide fuel cell system 3 is configured to purge the combustible gas passage 318 by using the power-generating raw material and purge the oxidizing gas passage 319 by using the oxidizing gas in the operation stop process. This configuration will be described below in detail. Accordingly, while the purging is being performed, the power-generating raw material and the remaining hydrogen-containing gas pushed out of the combustible gas passage 318 by the power-generating raw material are led from the anode side of the solid oxide fuel cell 310 to the combustor 327. It should be noted that, in the description herein, the power-generating raw material and the remaining hydrogen-containing gas are collectively referred to as a combustible gas. Meanwhile, the oxidizing gas is led from the cathode side of the solid oxide fuel cell 310 to the combustor 327. Then, in the combustor 327, the ignitor 325 ignites the combustible gas to bring the combustible gas into flaming combustion together with the oxidizing gas.

The reformer 326 uses the power-generating raw material and a reaction gas different from the power-generating raw material to generate the hydrogen-containing gas through a reforming reaction. Examples of the reforming reaction caused in the reformer 326 include a steam reforming reaction, an autothermal reaction, and a partial oxidation reaction. Since the reformer has already been described in relation to the solid oxide fuel cell system 1 according to Embodiment 1 in the above "Apparatus Configuration", a detailed description of the reformer is omitted.

The controller 350 controls various operations of respective components of the solid oxide fuel cell system 3. Specifically, in the case of performing purging in the operation stop process of the solid oxide fuel cell system 3, the controller 350 controls the power-generating raw material supply device 314 and the oxidizing gas supply device 322 in accordance with the temperature of the solid oxide fuel cell 310 and the temperature of the reformer 326 to adjust the supply amount of the power-generating raw material supplied to the fuel cell unit 312 and the supply amount of the oxidizing gas supplied to the fuel cell unit 312.

In order to realize the above control, for example, the controller 350 may include a timekeeper (not shown) and may be configured to control each of the supply amount of the power-generating raw material and the supply amount of the oxidizing gas based on the elapse of a predetermined time. Alternatively, for example, the solid oxide fuel cell system 3 may include flow rate detectors (not shown) and may be configured to control the supply amount of the power-generating raw material and the supply amount of the oxidizing gas based on respective cumulative flow rates. The flow rate detectors may be integrated with the power-generating raw material supply device 314 and the oxidizing gas supply device 322, respectively.

The solid oxide fuel cell system 3 may further include a temperature detector for detecting the temperature of the reformer 326. The solid oxide fuel cell system 3 may further include a temperature detector for detecting the temperature of the solid oxide fuel cell 310.

It should be noted that the solid oxide fuel cell system 3 need not include the above temperature detectors if the temperature of the reformer 326 and the temperature of the solid oxide fuel cell 310 can be estimated based on both the amount of generated electric power and an elapsed time from the start of the operation stop process of the solid oxide fuel cell system 3 or solely based on an elapsed time from the start of the operation stop process of the solid oxide fuel cell system 3.

(Operation Stop Process of Solid Oxide Fuel Cell System According to Embodiment 3)

Figure 11:
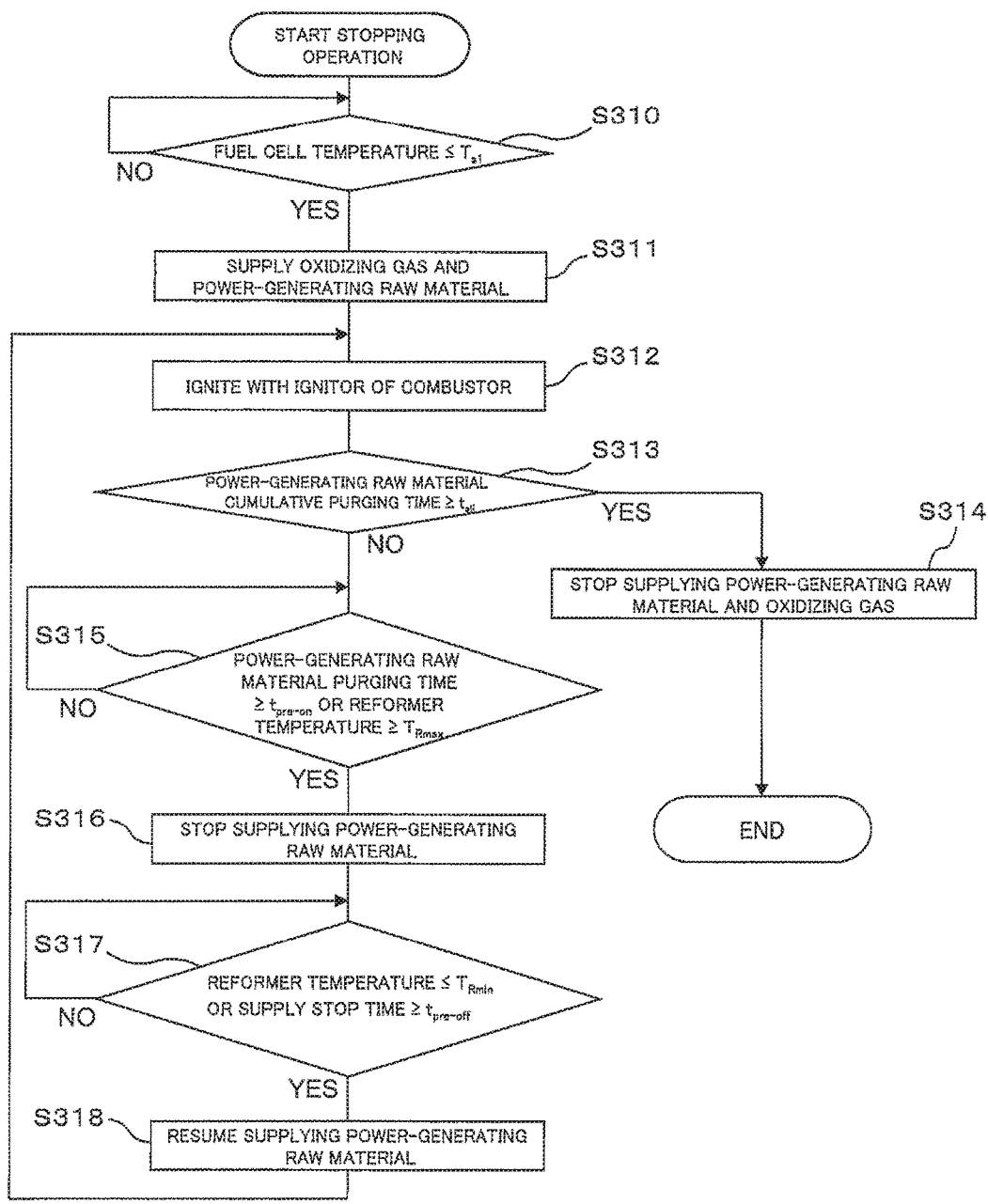
FIG. 11 is a flowchart showing one example of an operation stop process performed by the solid oxide fuel cell system according to Embodiment 3 of the present invention.

Next, a specific example of the operation stop process performed by the solid oxide fuel cell system 3 according to Embodiment 3 is described with reference to FIG. 11 and FIG. 12. FIG. 11 is a flowchart showing one example of the operation stop process performed by the solid oxide fuel cell system 3 according to Embodiment 3 of the present invention. For example, the operations shown in the flowchart may be realized through the loading and execution, by the controller 350, of a program stored in the storage unit (not shown).

Figure 12:
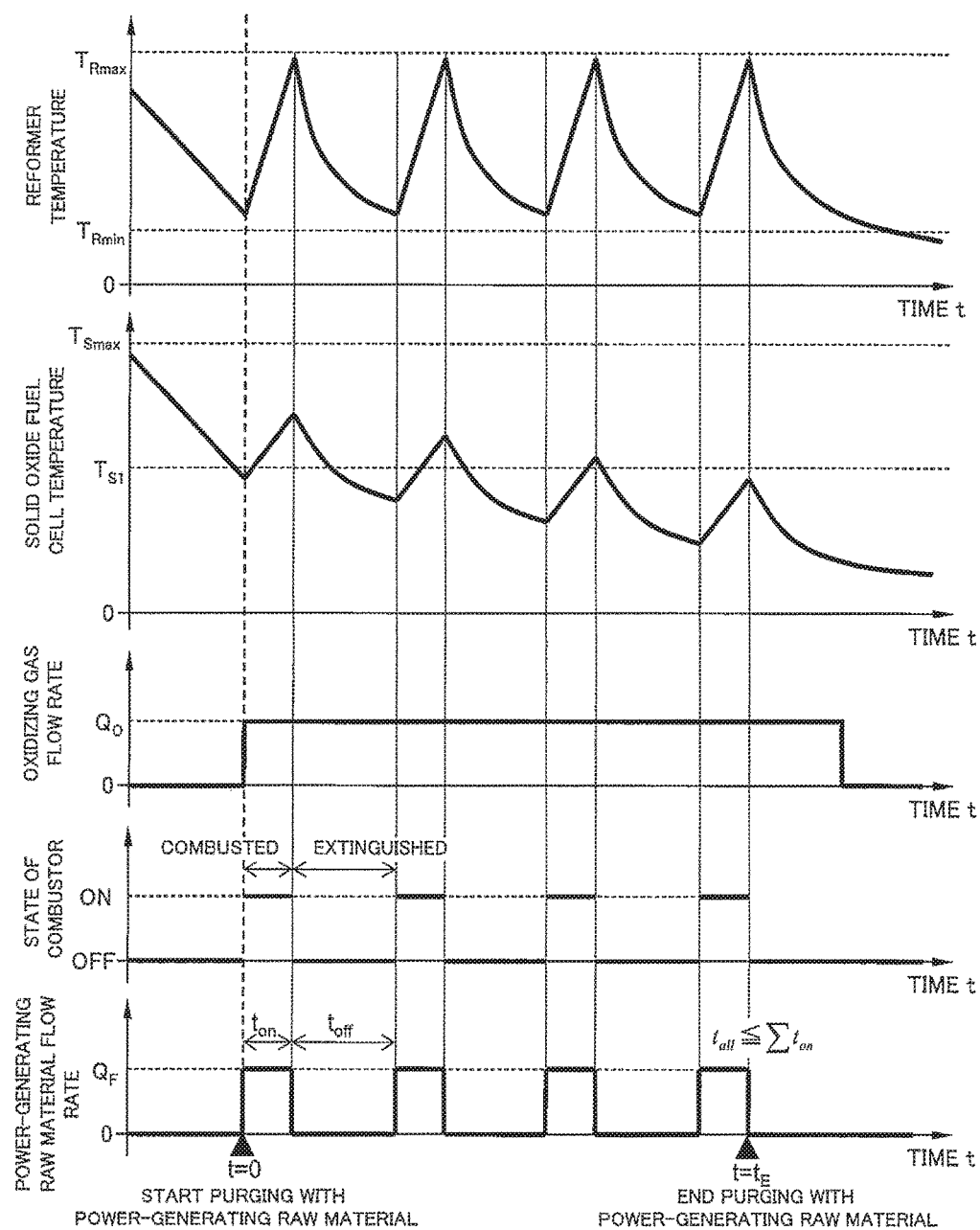
FIG. 12 shows one example of chronological changes in system components when the solid oxide fuel cell system operates in accordance with the flowchart shown in FIG. 11.

FIG. 12 shows one example of chronological changes in the system components when the solid oxide fuel cell system 3 operates in accordance with the flowchart shown in FIG. 11. FIG. 12 chronologically shows changes in the temperatures of the reformer 326 and the solid oxide fuel cell 310, changes in the flow rates of the oxidizing gas and the power-generating raw material, and changes in the combustion/extinction state of the combustor 327 in association with one another. The chart showing the changes in the flow rate of the power-generating raw material indicates that the purging of the combustible gas passage 318 utilizing the power-generating raw material is started at t=0, and the purging of the combustible gas passage 318 utilizing the power-generating raw material is ended at t=$t_E$. For the sake of convenience of the description, the flow rate of the power-generating raw material supplied per unit time is assumed to be a constant flow rate ($Q_F$).

First, when the operation stop process of the solid oxide fuel cell system 3 is started, the power generation by the solid oxide fuel cell 310 is stopped. At the time, the controller 350 controls the power-generating raw material supply device 314 to stop supplying the power-generating raw material to the fuel cell unit 312, and controls the oxidizing gas supply device 322 to stop supplying the oxidizing gas to the fuel cell unit 312. When the power generation by the solid oxide fuel cell 310 is stopped in this manner, the temperature of the solid oxide fuel cell 310 starts decreasing from about $T_{smax}$ as shown in FIG. 12.

The controller 350, for example, receives temperature information about the solid oxide fuel cell 310 as a detection result from a first temperature detector (not shown), which is provided in order to detect the temperature of the solid oxide fuel cell 310. Then, the controller 350 determines whether or not the temperature of the solid oxide fuel cell 310 is lower than or equal to a predetermined temperature $T_{s1}$ set in advance (step S310).

It should be noted that the predetermined temperature $T_{s1}$ is set as a temperature of the solid oxide fuel cell 310 at which the steam contained in the hydrogen-containing gas is not condensed and from which, after the purging has ended, the temperature of the solid oxide fuel cell 310 can be quickly decreased to a temperature at which the operation stop process can be confirmed complete. For example, the predetermined temperature $T_{s1}$ can be set to about 150° C.

If it is determined that the temperature of the solid oxide fuel cell 310 is lower than or equal to $T_{s1}$ ("YES" in step S310), the controller 350 controls the oxidizing gas supply device 322 to supply the oxidizing gas to the oxidizing gas passage 319, and controls the power-generating raw material supply device 314 to supply the power-generating raw material to the combustible gas passage 318 (step S311).

The oxidizing gas supplied to the oxidizing gas passage 319 is sent to the solid oxide fuel cell 310 through the oxidizing gas passage 319, and thereby the oxidizing gas passage 319 including the cathode gas passage 320 is purged and the solid oxide fuel cell 310 is cooled down. The oxidizing gas with which the oxidizing gas passage 319 has been purged is led to the combustor 327.

Meanwhile, the power-generating raw material supplied to the combustible gas passage 318 is sent to the solid oxide fuel cell 310 through the combustible gas passage 318 and the reformer 326, and thereby the combustible gas passage 318 including the anode gas passage 316 and the reformer 326 is purged. As a result, the hydrogen-containing gas remaining in the combustible gas passage 318 and the reformer 326 and the power-generating raw material are led to the combustor 327 as a combustible gas. As thus described, in the solid oxide fuel cell system 3, after the power generation is stopped, the purging is triggered, i.e., started, when the temperature of the solid oxide fuel cell 310 has become lower than or equal to $T_{s1}$.

Next, the controller 350 operates the ignitor 325 provided in the combustor 327 to ignite the combustible gas discharged from the anode side of the solid oxide fuel cell 310 (step S312), thereby bringing the combustible gas into flaming combustion together with the oxidizing gas discharged from the cathode side of the solid oxide fuel cell 310. The heat resulting from the flaming combustion heats the solid oxide fuel cell 310, and thereby the temperature of the solid oxide fuel cell 310, which has previously decreased to about $T_{s1}$, gradually increases as shown in FIG. 12.

As described above, the combustible gas discharged to the combustor 327 from the anode side of the solid oxide fuel cell 310 as a result of the purging using the power-generating raw material is brought into flaming combustion together with the oxidizing gas discharged to the combustor 327 from the cathode side of the solid oxide fuel cell 310. This makes it possible to prevent the combustible gas from being directly released to the external atmosphere of the fuel cell unit 312 through the exhaust gas passage 317, and thereby the safety of the solid oxide fuel cell system 3 can be secured.

Next, the controller 350 determines whether or not a total combustion time in the combustor 327 measured by the timekeeper (not shown), i.e., a total purging time (a cumulative purging time) of the purging with the power-generating raw material, is more than or equal to a predetermined necessary purging time $t_{all}$ set in advance (step S313). It should be noted that the necessary purging time $t_{all}$ may be a time necessary for entirely filling the combustible gas passage 318 extending from the power-generating raw material supply device 314 through the reformer 326 to the anode of the solid oxide fuel cell 310 with the power-generating raw material. Here, the volume of the power-generating raw material used to entirely fill the combustible gas passage 318 therewith is set to be more than or equal the volume of the combustible gas passage 318. The cumulative purging time is, as shown in FIG. 12, the sum of times ($\Sigma t_{on}$) during which the power-generating raw material is supplied (i.e., the sum of power-generating raw material purging times $t_{on}$.

That is, the solid oxide fuel cell system 3 is configured not to continuously supply the power-generating raw material to perform the purging for a predetermined time, but to intermittently supply the power-generating raw material to purge the combustible gas passage 318 with the supplied power-generating raw material. The reason for this is that by supplying the power-generating raw material intermittently, it is intended to prevent overheating of the solid oxide fuel cell 310 due to the heat generated by the combustion of the combustible gas. Accordingly, the cumulative purging time is the sum of separate purging times, in each of which the purging is performed with the power-generating raw material, which is supplied a plurality of times during the cumulative purging time.

If it is determined in step S313 that the cumulative purging time of the purging with the power-generating raw material has reached the necessary purging time $t_{all}$ ("YES" in step S313), the controller 350 determines that the purging of the entire combustible gas passage 318 with the power-generating raw material has been completed. In the case of "YES" in step S313, the controller 350 controls the power-generating raw material supply device 314 to stop supplying the power-generating raw material to the combustible gas passage 318, and controls the oxidizing gas supply device 322 to stop supplying the oxidizing gas (step S314). In this manner, the purging in the solid oxide fuel cell system 3 is completed, and the operation stop process is ended.

On the other hand, if it is determined in step S313 that the cumulative purging time of the purging with the power-generating raw material is less than the necessary purging time $t_{all}$, the controller 350 proceeds to step S315. In step S315, the controller 350 performs determination by comparison regarding a power-generating raw material purging time $t_{on}$ or the temperature of the reformer 326 (a reformer temperature). It should be noted that the power-generating raw material purging time $t_{on}$ is a time over which the power-generating raw material has been supplied in a single round of supply of the power-generating raw material.

Specifically, the controller 350 determines based on the time measured by the timekeeper (not shown) whether or not the power-generating raw material purging time $t_{on}$ is more than or equal to a purging time $t_{pre-on}$ set in advance. The controller 350 receives information from a second temperature detector provided on the reformer 326 about the temperature of the reformer 326 (the reformer temperature), the reformer temperature being detected by the second temperature detector, and determines whether or not the reformer temperature is higher than or equal to an upper limit reformer temperature $T_{Rmax}$ set in advance.

If it is determined that the power-generating raw material purging time $t_{on}$ is more than or equal to the purging time $t_{pre-on}$ set in advance, or determined that the reformer temperature is higher than or equal to the upper limit temperature $T_{Rmax}$ ("YES" in step S315), the controller 350 stops the supply of the power-generating raw material (step S316).

The reason for determining whether or not the power-generating raw material purging time $t_{on}$ is more than or equal to the purging time $t_{per-on}$ set in advance is to prevent the following situation: the power-generating raw material purging time $t_{on}$ becomes more than or equal to the purging time $t_{pre-on}$ set in advance; accordingly, the combustion time of the combustible gas led to the combustor 327 as a result of the purging with the power-generating raw material is prolonged, causing overheating of the solid oxide fuel cell 310 and the reformer 326; and thereby the power-generating raw material becomes carbonized, and the carbon is deposited on the solid oxide fuel cell 310 and the reforming catalyst in the reformer 326. In order to prevent the overheating of the solid oxide fuel cell 310 and the reformer 326, the power-generating raw material purging time $t_{on}$ is monitored, and if the power-generating raw material purging time $t_{on}$ has reached the purging time $t_{pre-on}$ set in advance, the controller 350 controls the power-generating raw material supply device 314 to stop supplying the power-generating raw material (step S316). By stopping the supply of the power-generating raw material, the controller 350 causes the flaming combustion in the combustor 327 to be extinguished, thereby preventing excessive increase in the temperatures of the solid oxide fuel cell 310 and the reformer 326. Therefore, the purging time $t_{pre-on}$ set in advance is suitably set to such a period of time that the temperatures of the solid oxide fuel cell 310 and the reformer 326 will be within a temperature range in which the supplied power-generating raw material will not be carbonized in the solid oxide fuel cell 310 and the reformer 326, i.e., set to such a period of time that the temperatures of the solid oxide fuel cell 310 and the reformer 326 will be lower than temperatures at which thermal decomposition of the power-generating raw material occurs.

Also, the reason for comparing the reformer temperature with the upper limit temperature $T_{Rmax}$ is to prevent excessive temperature increase of the reformer when the reformer is heated by the combustion heat of the combustible gas that has been led to the combustor 327 as a result of the purging utilizing the power-generating raw material. Specifically, while the power-generating raw material is flowing through the reforming catalyst of the reformer 326, if the temperature in the reforming catalyst has increased due to the combustion heat in the combustor 327 to become higher than or equal to the temperatures at which thermal decomposition of the power-generating raw material occurs, then the power-generating raw material becomes carbonized and the carbon is deposited on the reforming catalyst. In order to prevent the carbon deposition, the reformer temperature is directly monitored, and if the reformer temperature has reached the upper limit temperature $T_{Rmax}$, the controller 350 controls the power-generating raw material supply device 314 to stop supplying the power-generating raw material (step S316). By stopping the supply of the power-generating raw material, the controller 350 causes the flaming combustion in the combustor 327 to be extinguished, thereby preventing excessive increase in the temperature of the reformer 326.

In step S315 described above, if it is determined that the power-generating raw material purging time $t_{on}$ is more than or equal to the purging time $t_{pre-on}$ set in advance, or determined that the reformer temperature is higher than or equal to the upper limit temperature $T_{Rmax}$, then the controller 350 instructs to stop supplying the power-generating raw material. However, the configuration of the controller 350 is not thus limited. Alternatively, for example, the controller 350 may be configured to stop the supply of the power-generating raw material if it is determined not only that the power-generating raw material purging time $t_{on}$ is more than or equal to the purging time $t_{pre-on}$ set in advance, but also that the reformer temperature is higher than or equal to the upper limit temperature $T_{Rmax}$.

That is, while the purging is being performed with the supplied oxidizing gas and power-generating raw material, it will suffice if the controller 350 controls the power-generating raw material supply device 314 and thereby realizes the following technical features. Specifically, the controller 350 may be configured to perform intermittent supply of the power-generating raw material to the fuel cell unit 312 by allowing and stopping the supply of the power-generating raw material to the fuel cell unit 312 such that the temperatures of the reformer 326 and the solid oxide fuel cell 310 are within a temperature range that is lower than the temperatures at which thermal decomposition of the power-generating raw material occurs. More specifically, the controller 350 may be configured to perform intermittent supply of the power-generating raw material to the fuel cell unit 312 by stopping the supply of the power-generating raw material to the fuel cell unit 312 when the temperature of the reformer 326 has increased to the upper limit temperature $T_{Rmax}$, such that the temperature of the reformer 326 is lower than the temperatures at which thermal decomposition of the power-generating raw material occurs. Alternatively, the controller 350 may be configured to perform intermittent supply of the power-generating raw material to the fuel cell unit 312 by stopping the supply of the power-generating raw material to the fuel cell unit 312 when the power-generating raw material purging time $t_{on}$ has reached the purging time $t_{pre-on}$ set in advance, such that the temperature of the solid oxide fuel cell 310 is lower than the temperatures at which thermal decomposition of the power-generating raw material occurs.

After stopping the supply of the power-generating raw material in step S316, the controller 350 performs determination by comparison regarding a power-generating raw material supply stop time $t_{off}$ or the reformer temperature (step S317). Specifically, the controller 350 determines based on the time measured by the timekeeper (not shown) whether or not the power-generating raw material supply stop time $t_{off}$ is more than or equal to a supply stop time set in advance (a preset supply stop time $t_{pre-off}$). Alternatively, the controller 350 receives information from the second temperature detector provided on the reformer 326 about the reformer temperature, and determines whether or not the reformer temperature is lower than or equal to a lower limit reformer temperature $T_{Rmin}$ set in advance.

If it is determined that the power-generating raw material supply stop time $t_{off}$ is more than or equal to the preset supply stop time $t_{pre-off}$ or determined that the reformer temperature is lower than or equal to the lower limit temperature $T_{Rmin}$, the controller 350 resumes the supply of the power-generating raw material (step S318).

The reason for determining whether or not the power-generating raw material supply stop time $t_{off}$ is more than or equal to the preset supply stop time $t_{pre-off}$ is to prevent the following situation: the power-generating raw material supply stop time $t_{off}$ becomes more than or equal to the preset supply stop time $t_{pre-off}$; accordingly, the temperature of the reformer 326 in the fuel cell unit 312 decreases excessively; and the temperature decrease causes condensation of the steam contained in the hydrogen-containing gas in the reformer 326. In order to prevent the generation of condensation water in the reformer 326, the power-generating raw material supply stop time $t_{off}$ is monitored, and if the power-generating raw material supply stop time $t_{off}$ has reached the preset supply stop time $t_{pre-off}$, the controller 350 controls the power-generating raw material supply device 314 to resume supplying the power-generating raw material (step S318).

By resuming the supply of the power-generating raw material, the controller 350 causes flaming combustion of the combustible gas containing the power-generating raw material to occur in the combustor 327, thereby preventing excessive temperature decrease in the reformer 326. Therefore, the preset supply stop time $t_{pre-off}$ is suitably set to such a period of time that the temperature of the reformer 326 after the supply of the power-generating raw material is stopped will be within a temperature range in which no condensation water will be generated in the reformer 326.

The reason for comparing the reformer temperature with the lower limit temperature $T_{Rmin}$ while the supply of the power-generating raw material is being stopped is to prevent the following situation: when the temperature of the reformer 326 decreases, the steam contained in the hydrogen-containing gas remaining in the combustible gas passage 318 becomes condensed; and the condensation water thus generated degrades the durability of the reforming catalyst in the reformer 326 significantly. That is, the comparison is performed in order to directly monitor the temperature of the reformer 326 so that decrease in the temperature of the reformer 326 will not cause the temperature of the hydrogen-containing gas containing steam to fall to or below the dew point.

In step S318 described above, if it is determined that the power-generating raw material supply stop time $t_{off}$ is more than or equal to the preset supply stop time $t_{pre-off}$, or determined that the reformer temperature is lower than or equal to the lower limit temperature $T_{Rmin}$, then the controller 350 resumes the supply of the power-generating raw material. However, the configuration of the controller 350 is not thus limited. Alternatively, for example, the controller 350 may be configured to resume the supply of the power-generating raw material if it is determined not only that the power-generating raw material supply stop time $t_{off}$ is more than or equal to the preset supply stop time $t_{pre-off}$ but also that the reformer temperature is lower than or equal to the lower limit temperature $T_{Rmin}$.

That is, while the purging is being performed with the supplied oxidizing gas and power-generating raw material, it will suffice if the controller 350 controls the power-generating raw material supply device 314 and thereby realizes the following technical features. Specifically, the controller 350 may be configured to resume the supply of the power-generating raw material to the fuel cell unit 312 when the temperature of the reformer 326 has decreased below the temperatures at which thermal decomposition of the power-generating raw material occurs and reached the lower limit temperature $T_{Rmin}$, which is the lower limit temperature for water to exist as steam. Alternatively, the controller 350 may be configured to resume the supply of the power-generating raw material to the fuel cell unit 312 when the power-generating raw material supply stop time $t_{off}$ has reached the preset supply stop time $t_{pre-off}$ and the temperature of the solid oxide fuel cell 310 is in a temperature range that is lower than the temperatures at which thermal decomposition of the power-generating raw material occurs but not lower than a lower limit temperature $T_{Smin}$, which is the lower limit temperature for water to exist as steam.

Accordingly, in order to prevent the generation of condensation water on the reforming catalyst, the reformer temperature is monitored, and when the reformer temperature has reached the lower limit temperature $T_{Rmin}$, the controller 350 controls the power-generating raw material supply device 314 to resume supplying the power-generating raw material. Alternatively, if it is determined that the power-generating raw material supply stop time tow is more than or equal to the preset supply stop time $t_{pre-off}$, the controller 350 controls the power-generating raw material supply device 314 to resume supplying the power-generating raw material (step S318).

After step S318, the flow returns to step S312, and step S312 and the steps thereafter are performed again in the above-described manner. That is, the solid oxide fuel cell system 3 repeats allowing and stopping the supply of the power-generating raw material until the purging of the entire combustible gas passage 318 with the power-generating raw material is completed. By intermittently supplying the power-generating raw material in this manner, temperature increase and decrease of the solid oxide fuel cell 310 are repeated as shown in FIG. 12, and thereby the entire solid oxide fuel cell 310 is cooled down gradually.

As described above, by performing the operation stop process of the solid oxide fuel cell system 3 according to Embodiment 3 in accordance with the above-described flowchart, the combustible gas discharged from the combustible gas passage 318 as a result of the purging with the power-generating raw material can be brought into flaming combustion in the combustor 327. This makes it possible to safely stop the solid oxide fuel cell system 3 without discharging the combustible gas to the outside of the solid oxide fuel cell system 3.

Moreover, by performing the control to supply the power-generating raw material intermittently, increase in the temperatures of the components such as the solid oxide fuel cell 310 and the reformer 326 due to combustion heat generated as a result of bringing the combustible gas into flaming combustion in the combustor 327 is suppressed. This makes it possible to reduce the cooling time of the fuel cell unit 312, and prevent carbonization of the power-generating raw material (carbon deposition) due to excessive increase in the temperature of the reformer 326, thereby preventing degradation of the reforming catalyst and improving its durability.

Furthermore, by performing the control to supply the power-generating raw material intermittently, generation of condensation water on the reforming catalyst due to excessive decrease in the temperature of the reformer 326 can be prevented, which makes it possible to suppress durability degradation of the reforming catalyst.

Embodiment 4

Next, a solid oxide fuel cell system 4 according to Embodiment 4 of the present invention is described. The solid oxide fuel cell system 4 is configured such that the solid oxide fuel cell system 3 according to Embodiment 3 further includes: a hydrodesulfurizer 442 configured to remove sulfur compounds from the power-generating raw material; and a heater 413 configured to heat the hydrodesulfurizer 442.

Since the above configuration includes the hydrodesulfurizer 442, sulfur compounds contained in the power-generating raw material can be removed. Moreover, since the solid oxide fuel cell system 4 includes the heater 413, a flue gas generated as a result of flaming combustion in a combustor 427 is led to the heater 413, and the heater 413 can utilize the heat of the flue gas to heat the hydrodesulfurizer 442. In this manner, the hydrodesulfurizer 442 can be heated by utilizing the exhaust heat generated in the combustor 427. This makes it possible to improve energy utilization efficiency.

In the solid oxide fuel cell system 4, when the temperature of the hydrodesulfurizer 442 has decreased below the temperatures at which thermal decomposition of the power-generating raw material occurs and reached or fallen below a lower limit temperature $T_{Dmin}$, which is the lower limit temperature for water to exist as steam, a controller 450 controls an oxidizing gas supply device 422 and a power-generating raw material supply device 414 to intermittently supply the power-generating raw material to a fuel cell unit 412 while supplying the oxidizing gas to the fuel cell unit 412.

With the above configuration, the solid oxide fuel cell system 4 can adjust the amount of exhaust heat of the flue gas and properly control the temperature of the desulfurization catalyst. This makes it possible to prevent condensation of water contained in the hydrogen-containing gas due to excessive decrease in the temperature of the hydrodesulfurizer 442 and prevent carbon deposition due to excessive increase in the temperature of the hydrodesulfurizer 442. Therefore, the solid oxide fuel cell system 4 can prevent degradation of the desulfurization catalyst, thereby improving its durability.

The hydrodesulfurizer 442, which is supplied with hydrogen and removes sulfur compounds, is merely one example of a desulfurizer included in the solid oxide fuel cell system 4. The desulfurizer included in the solid oxide fuel cell system 4 is not limited to the hydrodesulfurizer 442, but may be an adsorption desulfurizer, for example.

(Configuration of Solid Oxide Fuel Cell System According to Embodiment 4)

Figure 13:
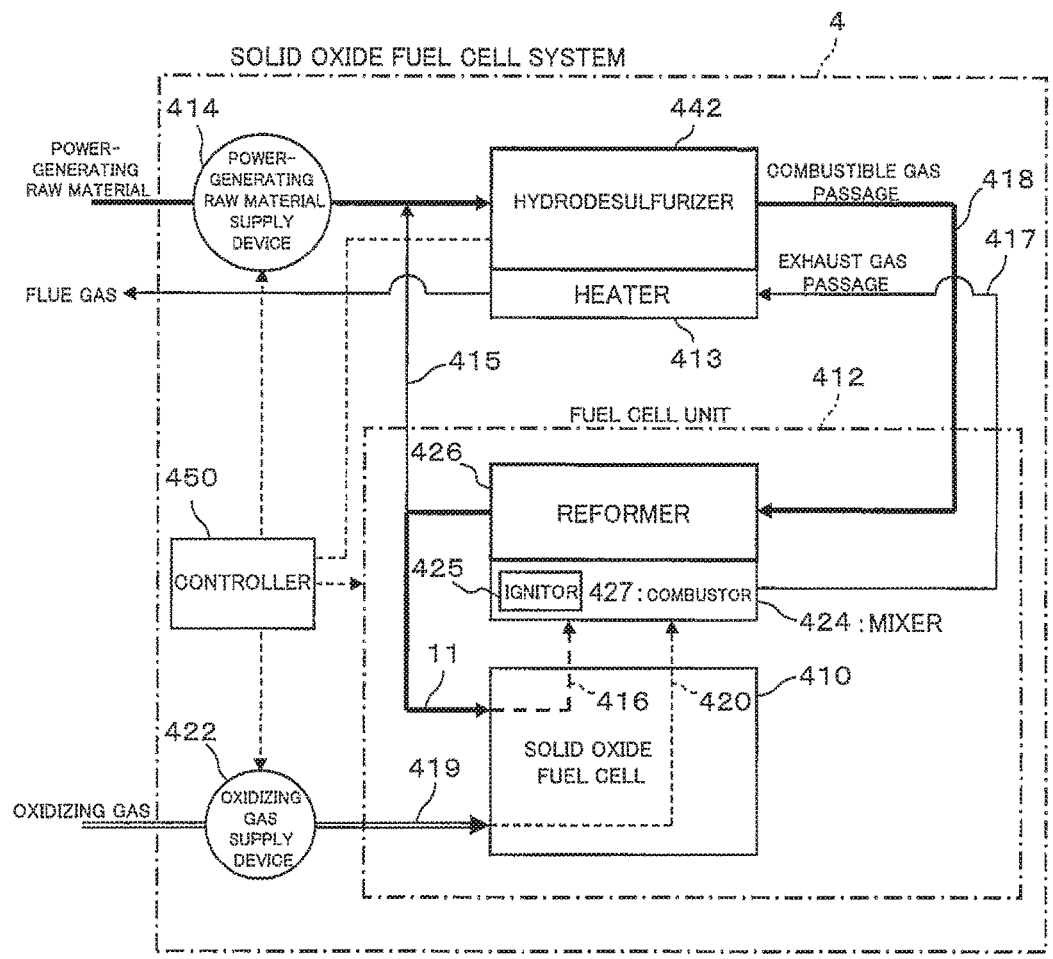
FIG. 13 is a block diagram showing one example of a schematic configuration of a solid oxide fuel cell system according to Embodiment 4 of the present invention.

Hereinafter, a more specific configuration of the above-described solid oxide fuel cell system 4 according to Embodiment 4 of the present invention is described with reference to FIG. 13. FIG. 13 is a block diagram showing one example of a schematic configuration of the solid oxide fuel cell system 4 according to Embodiment 4 of the present invention.

As shown in FIG. 13, the solid oxide fuel cell system 4 according to Embodiment 4 includes the fuel cell unit 412, the hydrodesulfurizer 442, the heater 413, the power-generating raw material supply device 414, the oxidizing gas supply device 422, a combustible gas passage 418, an oxidizing gas passage 419, an exhaust gas passage 417, a recycle passage 415, and the controller 450. The fuel cell unit 412 includes a solid oxide fuel cell 410, a reformer 426, and a mixer 424. The combustor 427, which is provided with an ignitor 425, is formed in the mixer 424.

That is, the configuration of the solid oxide fuel cell system 4 according to Embodiment 4 may be the same as that of the solid oxide fuel cell system 3 according to Embodiment 3, except that the solid oxide fuel cell system 4 further includes the hydrodesulfurizer 442, the heater 413, and the recycle passage 415. Accordingly, the power-generating raw material supply device 314, the oxidizing gas supply device 322, the solid oxide fuel cell 310, the reformer 326, and the mixer 324 (including the ignitor 325 and the combustor 327) included the solid oxide fuel cell system 3 according to Embodiment 3 are the same as the power-generating raw material supply device 414, the oxidizing gas supply device 422, the solid oxide fuel cell 410, the reformer 426, and the mixer 424 (including the ignitor 325 and the combustor 327) included in the solid oxide fuel cell system 4 according to Embodiment 4. Therefore, the description of these components in the solid oxide fuel cell system 4 is omitted.

The hydrodesulfurizer 442 serves to remove sulfur components from the power-generating raw material. In the solid oxide fuel cell system 4, as shown in FIG. 13, the hydrodesulfurizer 442 is disposed substantially at the center of the upper face side of the fuel cell unit 412, and is adjacent to the heater 413. The hydrodesulfurizer 442 is filled with a desulfurization agent, which is, for example, a desulfurization agent containing copper and zinc as described above in "Apparatus Configuration" in relation to the solid oxide fuel cell system 1 according to Embodiment 1.

It should be noted that the solid oxide fuel cell system 4 is configured to utilize part of the hydrogen-containing gas, which is obtained from the reforming in the reformer 426, as hydrogen necessary for hydrodesulfurization. The solid oxide fuel cell system 4 is configured to create a reflux flow of the hydrogen-containing gas through the recycle passage 415, which branches off from a part of the combustible gas passage 418, the part being positioned subsequent to the reformer 426, i.e., the part being positioned downstream of the reformer 426, and thereby the hydrogen-containing gas can be supplied to the hydrodesulfurizer 442. The power-generating raw material is, after being desulfurized by the hydrodesulfurizer 442, supplied to the reformer 426 through the combustible gas passage 418.

The heater 413 serves to heat the hydrodesulfurizer 442 to a suitable temperature for the desulfurization by utilizing the heat of the flue gas introduced from the exhaust gas passage 417. Inside the heater 413, a passage through which the flue gas flows is formed. The flue gas is, after imparting its heat to the hydrodesulfurizer 442 in the heater 413, discharged to the outside of the solid oxide fuel cell system 4 through the exhaust gas passage 417.

The controller 450 included in the solid oxide fuel cell system 4 according to Embodiment 4 operates as described below when performing purging in the operation stop process. That is, the controller 450 controls the power-generating raw material supply device 414 and the oxidizing gas supply device 422 in accordance with the temperature of the solid oxide fuel cell 410, the temperature of the reformer 426, and the temperature of the hydrodesulfurizer 442 to adjust the supply amount of the power-generating raw material supplied to the fuel cell unit 412 and the supply amount of the oxidizing gas supplied to the fuel cell unit 412. Hereinafter, the purging performed in the operation stop process is specifically described.

(Operation Stop Process of Solid Oxide Fuel Cell System According to Embodiment 4)

Figure 14:
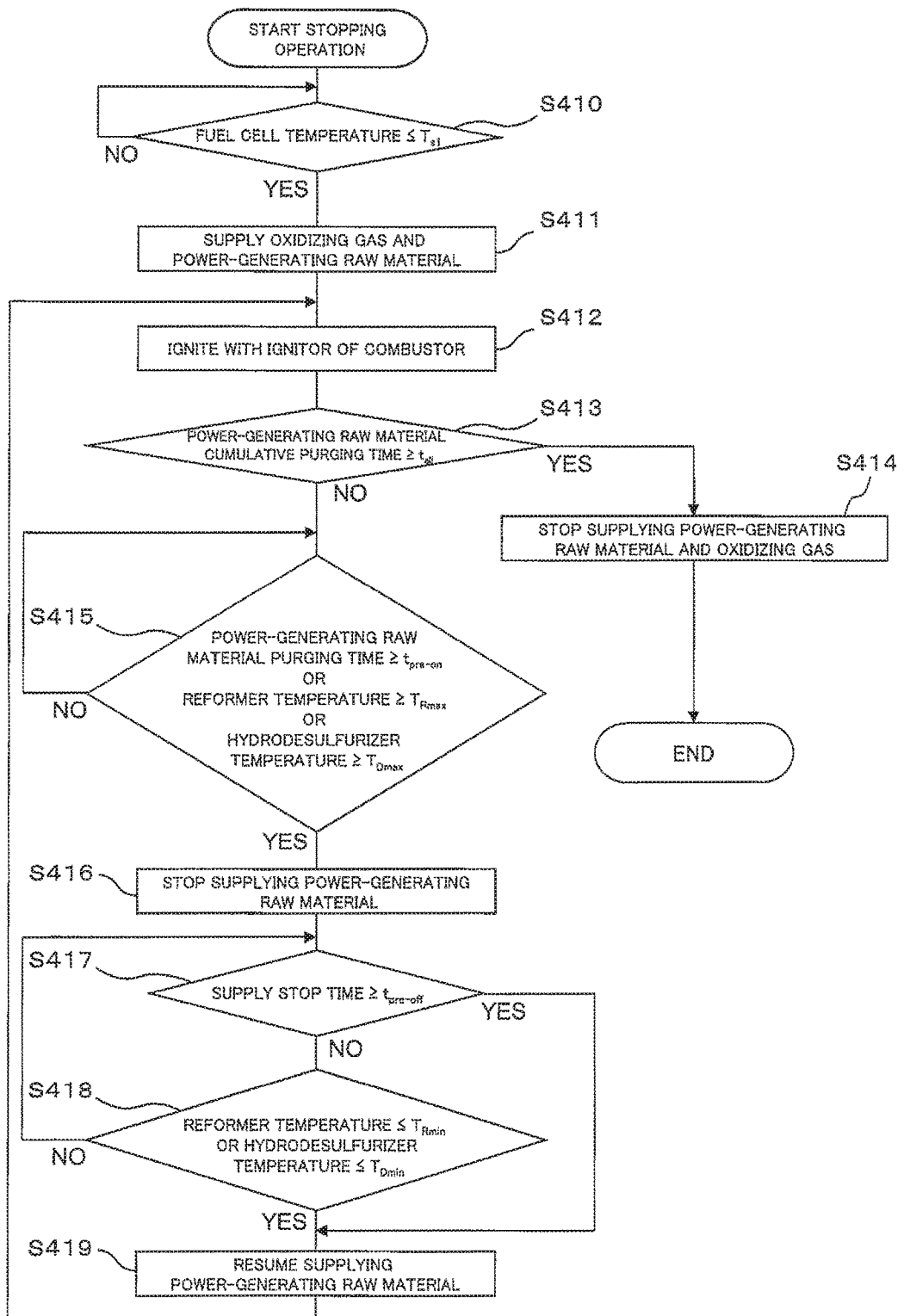
FIG. 14 is a flowchart showing one example of an operation stop process performed by the solid oxide fuel cell system according to Embodiment 4 of the present invention.

A specific example of the operation stop process performed by the solid oxide fuel cell system 4 according to Embodiment 4 is described with reference to FIG. 14 and FIG. 15. FIG. 14 is a flowchart showing one example of the operation stop process performed by the solid oxide fuel cell system 4 according to Embodiment 4 of the present invention. For example, the operations shown in the flowchart may be realized through the loading and execution, by the controller 450, of a program stored in the storage unit (not shown).

Figure 15:
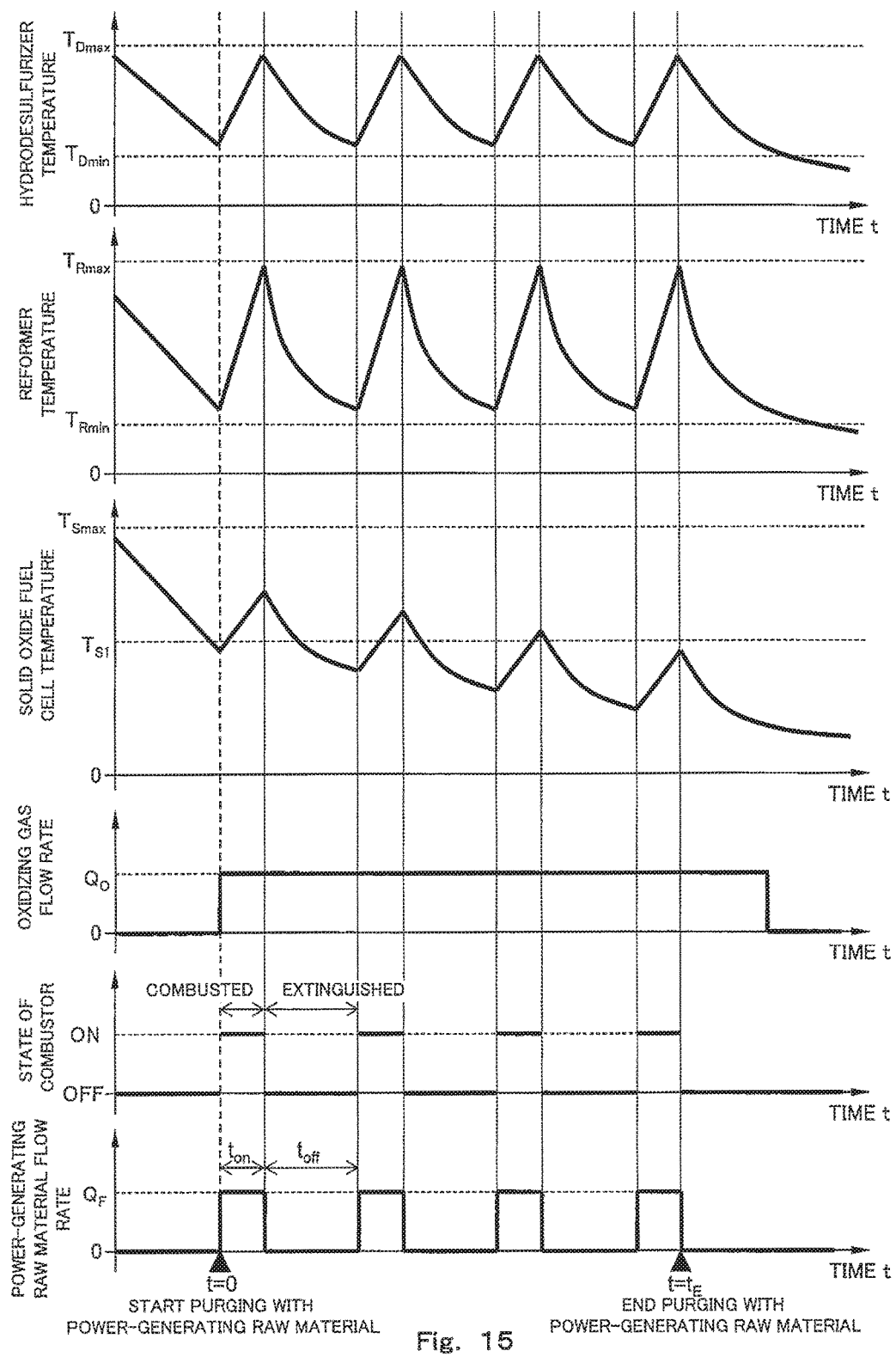
FIG. 15 shows one example of chronological changes in system components when the solid oxide fuel cell system operates in accordance with the flowchart shown in FIG. 14.

FIG. 15 shows one example of chronological changes in the system components when the solid oxide fuel cell system 4 operates in accordance with the flowchart shown in FIG. 14. FIG. 15 chronologically shows changes in the temperatures of the hydrodesulfurizer 442, the reformer 426, and the solid oxide fuel cell 410, changes in the flow rates of the oxidizing gas and the power-generating raw material, and changes in the combustion/extinction state of the combustor 427 in association with one another. The chart showing the changes in the flow rate of the power-generating raw material indicates that the purging of the combustible gas passage 418 utilizing the power-generating raw material is started at t=0, and the purging of the combustible gas passage 418 utilizing the power-generating raw material is ended at t=$t_E$. For the sake of convenience of the description, the flow rate of the power-generating raw material supplied per unit time is assumed to be a constant flow rate ($Q_F$).

It should be noted that, in the flowchart shown in FIG. 14, the processes from step S410 to step S414 are the same as the above-described processes from step S310 to step S314 in the flowchart shown in FIG. 11. Therefore, the description of the processes from step S410 to step S414 is omitted.

If it is determined in step S413 that the cumulative purging time of the purging with the power-generating raw material is less than the necessary purging time $t_{all}$ ("NO" in step S413), the controller 450 proceeds to step S415. In step S415, the controller 450 performs determination by comparison regarding the power-generating raw material purging time $t_{on}$, the reformer temperature, or a hydrodesulfurizer temperature.

Specifically, the controller 450 determines based on the time measured by the timekeeper (not shown) whether or not the power-generating raw material purging time $t_{on}$ is more than or equal to the purging time $t_{pre-on}$ set in advance. Alternatively, the controller 450 receives information from the second temperature detector provided on the reformer 426 about the reformer temperature detected by the second temperature detector, and determines whether or not the received reformer temperature is higher than or equal to the upper limit reformer temperature $T_{Rmax}$ set in advance. In the solid oxide fuel cell system 4 according to Embodiment 4, the hydrodesulfurizer 442 is provided with a third temperature detector for detecting the temperature of the hydrodesulfurizer 442. The controller 450 receives information from the third temperature detector provided on the hydrodesulfurizer 442 about the temperature of the hydrodesulfurizer 442 (a hydrodesulfurizer temperature), the hydrodesulfurizer temperature being detected by the third temperature detector, and determines whether or not the received hydrodesulfurizer temperature is higher than or equal to an upper limit hydrodesulfurizer temperature $T_{Dmax}$ set in advance. That is, step S415 may be configured such that the determination whether or not the hydrodesulfurizer temperature is higher than or equal to the upper limit hydrodesulfurizer temperature $T_{Dmax}$ is additionally performed in step S315 in the operation stop process of the solid oxide fuel cell system 3 according to Embodiment 3.

The determination as to whether or not the power-generating raw material purging time $t_{on}$ is more than or equal to the purging time $t_{pre-on}$ set in advance, and the comparison of the reformer temperature with the upper limit temperature $T_{Rmax}$, have been described above in relation to the solid oxide fuel cell system 3 according to Embodiment 3. Therefore, the description of these determination and comparison is omitted.

The reason for comparing the hydrodesulfurizer temperature with the upper limit hydrodesulfurizer temperature $T_{Dmax}$ is as follows. Specifically, at the time of purging using the power-generating raw material, the flue gas generated as a result of the flaming combustion in the combustor 327 is led to the heater 413, and the heater 413 is configured to heat the hydrodesulfurizer 442 by utilizing the heat of the flue gas. Here, if the temperature of the hydrodesulfurizer 442 heated by the heater 413 increases excessively, the power-generating raw material flowing through the hydrodesulfurizer 442 becomes carbonized, and thereby carbon deposition occurs. Therefore, the controller 450 monitors whether or not the temperature of the hydrodesulfurizer 442 has reached the upper limit hydrodesulfurizer temperature $T_{Dmax}$, and if it is determined that the temperature of the hydrodesulfurizer 442 has reached the upper limit hydrodesulfurizer temperature $T_{Dmax}$, the controller 450 instructs the power-generating raw material supply device 414 to stop supplying the power-generating raw material. In accordance with the control instruction from the controller 450, the power-generating raw material supply device 414 stops supplying the power-generating raw material (step S416).

After the supply of the power-generating raw material is stopped in step S416, in the following step S417, the controller 450 performs determination by comparison regarding the power-generating raw material supply stop time. Specifically, the controller 450 determines based on the time measured by the timekeeper (not shown) whether or not a time over which the supply of the power-generating raw material has been stopped (the supply stop time $t_{off}$) is more than or equal to the supply stop time set in advance (the preset supply stop time $t_{pre-off}$). If it is determined that the supply stop time $t_{off}$ is more than or equal to the preset supply stop time $t_{pre-off}$ ("YES" in step S417), the controller 450 instructs the power-generating raw material supply device 414 to resume supplying the power-generating raw material. In accordance with the control instruction from the controller 450, the power-generating raw material supply device 414 resumes supplying the power-generating raw material (step S419).

On the other hand, if it is determined that the power-generating raw material supply stop time $t_{off}$ is less than the preset supply stop time $t_{pre-off}$ ("NO" in step S417), the flow proceeds to step S418. In step S418, the controller 450 receives information from the second temperature detector provided on the reformer 426 about the reformer temperature, and determines whether or not the received reformer temperature is lower than or equal to the lower limit reformer temperature $T_{Rmin}$ set in advance. Alternatively, the controller 450 receives information from the third temperature detector provided on the hydrodesulfurizer 442 about the hydrodesulfurizer temperature, and determines whether or not the received hydrodesulfurizer temperature is lower than or equal to the lower limit hydrodesulfurizer temperature $T_{Dmin}$, set in advance.

The reason for determining whether or not the reformer temperature is lower than or equal to the lower limit reformer temperature $T_{Rmin}$, or determining whether or not the hydrodesulfurizer temperature is lower than or equal to the lower limit hydrodesulfurizer temperature $T_{Dmin}$, is as follows. Specifically, when the supply of the power-generating raw material is stopped, the flaming combustion in the combustor 427 is stopped, accordingly. This causes decrease in the temperatures of the hydrodesulfurizer 442 and the reformer 426. If the temperatures of the hydrodesulfurizer 442 and the reformer 426 decrease excessively, the temperature of the hydrogen-containing gas remaining in the combustible gas passage 418 and containing steam falls to or below the dew point, causing water condensation, and consequently, the durability of the catalysts in the hydrodesulfurizer 442 and the reformer 426 is degraded significantly. Therefore, in order to prevent the durability degradation of the catalysts in the hydrodesulfurizer 442 and the reformer 426 due to condensation water, the reformer temperature or the hydrodesulfurizer temperature is monitored so that the reformer temperature or the hydrodesulfurizer temperature will not fall below the lower limit temperature $T_{Rmin}$ or the lower limit temperature $T_{Dmin}$, at each of which steam condensation does not occur. In practice, it is necessary to keep the temperatures of the hydrodesulfurizer 442, the reformer 426, and the passage connecting the hydrodesulfurizer 442 and the reformer 426 within a temperature range that does not cause steam condensation. However, since the temperature of the section from the hydrodesulfurizer 442 to the reformer 426 in the solid oxide fuel cell system according to Embodiment 4 is substantially constant, only the temperature of the hydrodesulfurizer 442 or the reformer 426 is monitored. If the temperature of the hydrodesulfurizer 442 and the temperature of the reformer 426 are not substantially the same for system configurational reasons, the hydrodesulfurizer 442, the reformer 426, and the passage connecting the hydrodesulfurizer 442 and the reformer 426 may be provided with temperature detectors, respectively, and temperatures detected by the respective temperature detectors may be monitored so that the temperatures will not fall below the respective lower limit temperatures, at each of which steam condensation does not occur.

If it is determined that the temperature of the reformer 426 has decreased to the lower limit temperature $T_{Rmin}$, or determined that the temperature of the hydrodesulfurizer 442 has decreased to the lower limit temperature $T_{Dmin}$, the controller 450 controls the power-generating raw material supply device 414 to resume supplying the power-generating raw material. In accordance with the control instruction from the controller 450, the power-generating raw material supply device 414 resumes supplying the power-generating raw material to the fuel cell unit 412 (step S419). Thereafter, the flow returns to step S412, in which the combustible gas discharged from the anode is ignited by the ignitor 325 in the combustor 327, and thereby combusted together with the oxidizing gas. Then, the processes in step S413 and the following steps are performed again. In this manner, the solid oxide fuel cell system 4 according to Embodiment 4 repeats allowing and stopping the supply of the power-generating raw material until the purging of the entire combustible gas passage 418 is completed. By intermittently supplying the power-generating raw material in this manner, temperature increase and decrease of the solid oxide fuel cell 410 are repeated as shown in FIG. 15, and thereby the entire solid oxide fuel cell 410 is cooled down gradually.

The solid oxide fuel cell system 4 according to Embodiment 2 is configured to resume supplying the power-generating raw material if it is determined in step S417 that the supply stop time is more than or equal to the preset supply stop time $t_{pre-off}$. Also, the solid oxide fuel cell system 4 is configured to resume supplying the power-generating raw material if it is determined that the reformer temperature has decreased to the lower limit temperature $T_{Rmin}$, or determined that the hydrodesulfurizer temperature has decreased to the lower limit temperature $T_{Dmin}$, even if the supply stop time is less than the preset supply stop time $t_{pre-off}$. However, the configuration of the solid oxide fuel cell system 4 is not thus limited. Alternatively, for example, the solid oxide fuel cell system 4 may be configured to resume supplying the power-generating raw material if the controller 450 makes at least one of the following determinations: a determination that the supply stop time is more than or equal to the preset supply stop time $t_{pre-off}$; a determination that the reformer temperature has decreased to the lower limit temperature $T_{Rmin}$; and a determination that the hydrodesulfurizer temperature has decreased to the lower limit temperature $T_{Dmin}$.

As described above, at the time of stopping operating, the solid oxide fuel cell system 4 according to Embodiment 4 performs the above-described processes, and thereby the hydrogen-containing gas in the combustible gas passage 418 can be discharged to the combustor 427 by the supplied power-generating raw material, and the power-generating raw material and the hydrogen-containing gas can be brought into flaming combustion. This makes it possible to safely stop the solid oxide fuel cell system 4 according to Embodiment 4 without discharging the combustible gas to the external atmosphere of the fuel cell unit 412.

Moreover, by performing the control to supply the power-generating raw material intermittently, increase in the temperatures of the components such as the solid oxide fuel cell 410, the hydrodesulfurizer 442, and the reformer 426 due to combustion heat generated as a result of bringing the combustible gas into flaming combustion in the combustor 427 is suppressed. This makes it possible to reduce the cooling time of the fuel cell unit 412, and prevent carbonization of the power-generating raw material (carbon deposition) due to excessive increase in the temperatures of the desulfurization catalyst of the hydrodesulfurizer 442 and the reforming catalyst of the reformer 426, thereby preventing degradation of the catalysts and improving their durability.

Furthermore, by performing the control to supply the power-generating raw material intermittently, generation of condensation water on the reforming catalyst and the desulfurization catalyst due to excessive decrease in the temperatures of the reformer 426 and the hydrodesulfurizer 442 can be prevented, which makes it possible to suppress durability degradation of the reforming catalyst and the desulfurization catalyst.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

One aspect of the present invention is useful as a solid oxide fuel cell system with improved durability.

REFERENCE SIGNS LIST 1 solid oxide fuel cell system
2 solid oxide fuel cell system
3 solid oxide fuel cell system
4 solid oxide fuel cell system
10 solid oxide fuel cell
12 fuel cell unit
14 power-generating raw material supply device
16 anode gas passage
18 combustible gas passage
20 cathode gas passage
22 oxidizing gas supply device
24 mixer
26 hydrodesulfurizer
50 controller
100 solid oxide fuel cell system
110 solid oxide fuel cell
112 fuel cell unit
114 power-generating raw material supply device
118 combustible gas passage
120 cathode gas passage
122 oxidizing gas supply device
124 mixer
125 ignitor
126 reformer
128 desulfurizer
130 reforming water supply device
132 exhauster
134 first valve
136 bypass passage
137 second valve
138 first desulfurizer
140 recycle gas passage
141 third valve
142 second desulfurizer
150 controller
200 solid oxide fuel cell system
310 solid oxide fuel cell
312 fuel cell unit
314 power-generating raw material supply device
316 anode gas passage
317 exhaust gas passage
318 combustible gas passage
319 oxidizing gas passage
320 cathode gas passage
322 oxidizing gas supply device
324 mixer
325 ignitor
326 reformer
327 combustor
350 controller
410 solid oxide fuel cell
412 fuel cell unit
413 heater
414 power-generating raw material supply device
415 recycle passage
417 exhaust gas passage
418 combustible gas passage
419 oxidizing gas passage
420 cathode gas passage
422 oxidizing gas supply device
424 mixer
425 ignitor
426 reformer
427 combustor
442 hydrodesulfurizer
450 controller

The invention claimed is:

1. A solid oxide fuel cell system comprising:
a fuel cell unit including a solid oxide fuel cell and a mixer, the solid oxide fuel cell including an anode gas passage and a cathode gas passage, the mixer mixing an anode off gas discharged from the anode gas passage and a cathode off gas discharged from the cathode gas passage;
a power-generating raw material supply device operative to supply a power-generating raw material to the fuel cell unit;
a combustible gas passage, which extends from the power-generating raw material supply device to a downstream end of the anode gas passage;
an oxidizing gas supply device operative to supply an oxidizing gas to the cathode gas passage; and
a controller operative to, after electric power generation by the fuel cell unit is stopped, control the power-generating raw material supply device to supply the power-generating raw material in a volume more than or equal to a volume of the combustible gas passage to the combustible gas passage, and concurrently control the oxidizing gas supply device to supply the oxidizing gas to the cathode gas passage.

2. The solid oxide fuel cell system according to claim 1, wherein
the controller controls the oxidizing gas supply device such that a volume of the oxidizing gas supplied to the cathode gas passage after the electric power generation by the fuel cell unit is stopped is more than or equal to a volume of the cathode gas passage.

3. The solid oxide fuel cell system according to claim 2, wherein
the controller controls the oxidizing gas supply device such that the supply of the oxidizing gas to the cathode gas passage is continued after the supply of the power-generating raw material to the combustible gas passage is stopped after the electric power generation by the fuel cell unit is stopped.

4. The solid oxide fuel cell system according to claim 1, wherein
the mixer includes an ignitor operative to ignite and combust a mixed gas of the anode off gas and the cathode off gas, and
the controller controls the ignitor to ignite and combust the mixed gas of the anode off gas and the cathode off gas after the electric power generation by the fuel cell unit is stopped.

5. The solid oxide fuel cell system according to claim 4, comprising an oxidizing gas passage, which extends from the oxidizing gas supply device to a downstream end of the cathode gas passage and through Which the oxidizing gas flows, wherein
the controller, in an operation stop process of the solid oxide fuel cell system, controls the oxidizing gas supply device to supply the oxidizing gas through the oxidizing gas passage, controls the power-generating raw material supply device to intermittently supply the power-generating raw material through the combustible gas passage, and controls the ignitor to ignite a combustible gas that is discharged to the mixer intermittently in accordance with the intermittent supply of the power-generating raw material.

6. The solid oxide fuel cell system according to claim 5, wherein
the fuel cell unit includes a reformer operative to reform the power-generating raw material to generate a hydrogen-containing gas, and
the controller controls the oxidizing gas supply device and the power-generating raw material supply device to supply the power-generating raw material to the fuel cell unit intermittently while supplying the oxidizing gas to the fuel cell unit, such that a temperature of the reformer is lower than temperatures at which thermal decomposition of the power-generating raw material occurs.

7. The solid oxide fuel cell system according to claim 6, wherein
the controller controls the oxidizing gas supply device and the power-generating raw material supply device to start supplying the power-generating raw material to the fuel cell unit while supplying the oxidizing gas to the fuel cell unit when the temperature of the reformer has decreased below the temperatures at which thermal decomposition of the power-generating raw material occurs and reached a lower limit temperature for water to exist as steam.

8. The solid oxide fuel cell system according to claim 5, wherein
the controller controls the oxidizing gas supply device and the power-generating raw material supply device to supply the power-generating raw material to the fuel cell unit intermittently while supplying the oxidizing gas to the fuel cell unit, such that a temperature of the solid oxide fuel cell is lower than temperatures at which thermal decomposition of the power-generating raw material occurs.

9. The solid oxide fuel cell system according to claim 5, wherein
the fuel cell unit includes a reformer operative to reform the power-generating raw material to generate a hydrogen-containing gas, and
the controller controls the oxidizing gas supply device and the power-generating raw material supply device to supply the power-generating raw material to the fuel cell unit intermittently while supplying the oxidizing gas to the fuel cell unit, such that a temperature of the reformer and a temperature of the solid oxide fuel cell are lower than temperatures at which thermal decomposition of the power-generating raw material occurs.

10. The solid oxide fuel cell system according to claim 1, wherein
the fuel cell unit includes a hydrodesulfurizer operative to remove a sulfur compound from the power-generating raw material supplied from the power-generating raw material supply device.

11. The solid oxide fuel cell system according to claim 10, wherein
the hydrodesulfurizer is heated by exhaust heat generated as a result of combusting a mixed gas of the anode off gas and the cathode off gas.

12. The solid oxide fuel cell system according to claim 10, wherein
the controller controls the oxidizing gas supply device and the power-generating material supply device to start supplying the power-generating raw material to the fuel cell unit while supplying the oxidizing gas to the fuel cell unit when a temperature of the hydrodesulfurizer has decreased below temperatures at which thermal decomposition of the power-generating raw material occurs and reached a lower limit temperature for water to exist as steam.

13. A method of stopping a solid oxide fuel cell system, the method comprising:
stopping electric power generation by a fuel cell unit including a solid oxide fuel cell;
in a case where a passage extending from a power-generating raw material supply device to a downstream end of an anode gas passage of the solid oxide fuel cell serves as a combustible gas passage, after the electric power generation by the fuel cell unit is stopped, supplying a power-generating raw material in a volume more than or equal to a volume of the combustible gas passage to the combustible gas passage, and concurrently supplying an oxidizing gas to a cathode gas passage of the solid oxide fuel cell; and
mixing an anode off gas discharged from the anode gas passage and a cathode off gas discharged from the cathode gas passage, and combusting the mixed gas.

14. The method of stopping a solid oxide fuel cell system according to claim 13, wherein
after the electric power generation by the fuel cell unit is stopped and when the supply of the power-generating raw material to the combustible gas passage is started, a temperature of the solid oxide fuel cell is not lower than 100° C. and not higher than 400° C.

* * * * *